(12) United States Patent
Mitsutomi et al.

(10) Patent No.: US 10,458,515 B2
(45) Date of Patent: Oct. 29, 2019

(54) FRICTIONAL POWER TRANSMISSION BELT AND PROCESS FOR PRODUCING SAME

(71) Applicant: Mitsuboshi Belting Ltd., Kobe-shi, Hyogo (JP)

(72) Inventors: Manabu Mitsutomi, Hyogo (JP); Yoshihito Noborikawa, Hyogo (JP); Tsuyoshi Takehara, Hyogo (JP)

(73) Assignee: Mitsuboshi Belting Ltd., Kobe-shi, Hyogo (JP)

( * ) Notice: Subject to any disclaimer, the term of this patent is extended or adjusted under 35 U.S.C. 154(b) by 193 days.

(21) Appl. No.: 15/590,426

(22) Filed: May 9, 2017

(65) Prior Publication Data

US 2017/0241512 A1    Aug. 24, 2017

Related U.S. Application Data

(62) Division of application No. 14/439,822, filed as application No. PCT/JP2013/079598 on Oct. 31, 2013, now Pat. No. 9,695,907.

(30) Foreign Application Priority Data

Oct. 31, 2012  (JP) .................................. 2012-240787
Aug. 21, 2013  (JP) .................................. 2013-171044

(51) Int. Cl.
*B29C 43/10*  (2006.01)
*B29D 29/08*  (2006.01)
(Continued)

(52) U.S. Cl.
CPC ............. *F16G 5/08* (2013.01); *B29C 43/104* (2013.01); *B29C 43/12* (2013.01); *B29D 29/08* (2013.01);
(Continued)

(58) Field of Classification Search
CPC ... B29D 29/08; B29D 29/103; B29L 2029/00; B29L 2031/7094; F16G 1/08; F16G 1/10;
(Continued)

(56) References Cited

U.S. PATENT DOCUMENTS 5,120,281 A   6/1992  Mishima et al.
5,971,879 A   10/1999  Westhoff
(Continued)

FOREIGN PATENT DOCUMENTS

JP    61-65937 A  *  4/1986
JP    H10318334 A    12/1998
(Continued)

OTHER PUBLICATIONS

Feb. 4, 2014—International Search Report—Intl App PCT/JP2013/079598.
(Continued)

*Primary Examiner* — Michael A Tolin
(74) *Attorney, Agent, or Firm* — Banner & Witcoff, Ltd.

(57) ABSTRACT

A production method for producing a frictional power transmission belt containing an extensible layer forming a belt back surface, a compressive rubber layer formed on one surface of the extensible layer and frictionally engaging at the lateral surface thereof with pulleys, and a tension member embedded between the extensible layer and the compressive rubber layer along the belt length direction. A surface of at least a part of the compressive rubber layer to be in contact with pulleys is coated with a fiber/resin mixture layer that contains a resin component and heat-resistant fibers having a softening point or a melting point higher than a vulcanization temperature in a mixed state, and the heat-resistant fibers contain a fiber embedded so as to extend from the fiber/resin mixture layer to the compressive rubber layer.

14 Claims, 4 Drawing Sheets

(51) Int. Cl.
*F16G 1/08* (2006.01)
*F16G 1/28* (2006.01)
*F16G 5/06* (2006.01)
*F16G 5/08* (2006.01)
*F16G 5/20* (2006.01)
*B29C 43/12* (2006.01)
*B29C 43/32* (2006.01)
*B29L 31/00* (2006.01)
*B29K 75/00* (2006.01)
*B29D 29/10* (2006.01)
*B60C 9/22* (2006.01)

(52) U.S. Cl.
CPC .............. *F16G 5/06* (2013.01); *F16G 5/20* (2013.01); *B29C 2043/3233* (2013.01); *B29D 29/103* (2013.01); *B29K 2023/06* (2013.01); *B29K 2075/00* (2013.01); *B29L 2031/7094* (2013.01); *B60C 9/22* (2013.01); *F16G 1/08* (2013.01); *F16G 1/28* (2013.01)

(58) Field of Classification Search
CPC ..... F16G 1/28; F16G 5/06; F16G 5/08; F16G 5/14; F16G 5/20; B29C 43/104; B29C 43/12; B29C 2043/3233
See application file for complete search history.

(56) References Cited

U.S. PATENT DOCUMENTS

| | | | |
|---|---|---|---|
| 6,294,600 B1 * | 9/2001 | Takada | C08K 5/14 524/105 |
| 8,293,357 B2 | 10/2012 | Cretin et al. | |
| 2006/0154770 A1 | 7/2006 | Takaba et al. | |
| 2007/0060431 A1 * | 3/2007 | Hineno | F16G 5/06 474/263 |
| 2007/0249452 A1 * | 10/2007 | South | F16G 1/28 474/263 |
| 2008/0207371 A1 | 8/2008 | Dieudonne et al. | |
| 2010/0075793 A1 | 3/2010 | Cretin et al. | |
| 2010/0173740 A1 * | 7/2010 | Mori | B29D 29/103 474/252 |
| 2011/0218069 A1 * | 9/2011 | Nakashima | F16G 1/08 474/260 |
| 2011/0269588 A1 | 11/2011 | Fleck et al. | |
| 2011/0269589 A1 * | 11/2011 | Schleicher | F16G 1/28 474/205 |
| 2012/0058849 A1 | 3/2012 | Yoshida | |
| 2014/0296011 A1 | 10/2014 | Yoshida et al. | |
| 2014/0323257 A1 * | 10/2014 | Gibson | F16G 5/08 474/261 |
| 2014/0364260 A1 | 12/2014 | Takahashi et al. | |
| 2015/0024892 A1 * | 1/2015 | Hineno | C08K 3/04 474/237 |

FOREIGN PATENT DOCUMENTS

| | | |
|---|---|---|
| JP | 2002-039275 A | 2/2002 |
| JP | 2003-202055 A | 7/2003 |
| JP | 2006-153152 A | 6/2006 |
| JP | 2008-185162 A | 8/2008 |
| JP | 2008-281153 A | 11/2008 |
| JP | 2008265031 A | 11/2008 |
| JP | 2009-196135 A | 9/2009 |
| JP | 2009-533606 A | 9/2009 |
| JP | 2010-101489 A | 5/2010 |
| JP | 2010-242825 A | 10/2010 |
| WO | 2010/134289 A1 | 11/2010 |
| WO | WO 2013/091809 A1 * | 6/2013 |

OTHER PUBLICATIONS

Nov. 25, 2015—(JP) Notification of Reasons for Refusal—App 2013-171044—Eng Tran.
Oct. 29, 2015—(JP) Notification from Commissioner of JPO—App 2013-171044—Eng Tran.
Jul. 21, 2016—U.S. Non-Final Office Action—U.S. Appl. No. 14/439,822.
Jul. 22, 2016—(EP) Extended Search Report—App 13850499.8.
May 24, 2016 (JP) Office Action—App 2013-171044 with translation.
Nov. 3, 2016—U.S. Final Office Action—U.S. Appl. No. 14/439,822.
Mar. 3, 2017—U.S. Notice of Allowance—U.S. Appl. No. 14/439,822.
Apr. 5, 2017—(EP) Office Action—App 13850499.8.

* cited by examiner

[FIG. 1]
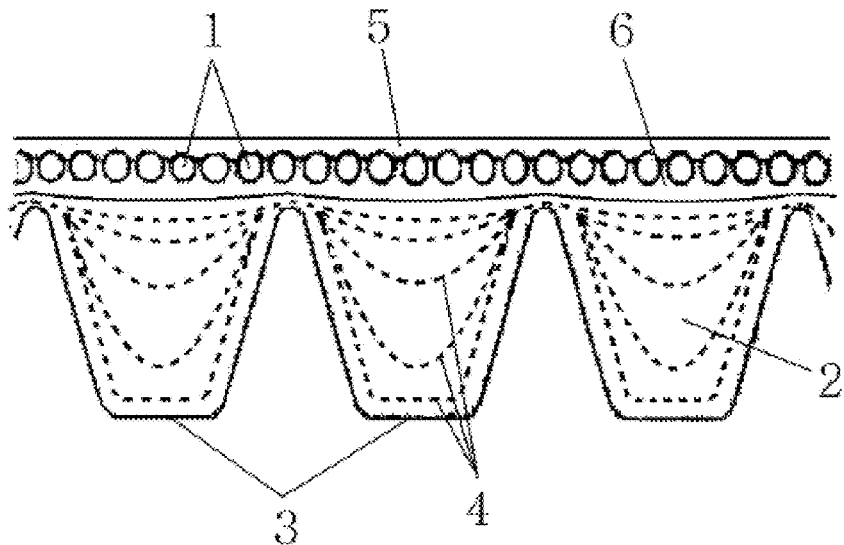
[FIG. 2]
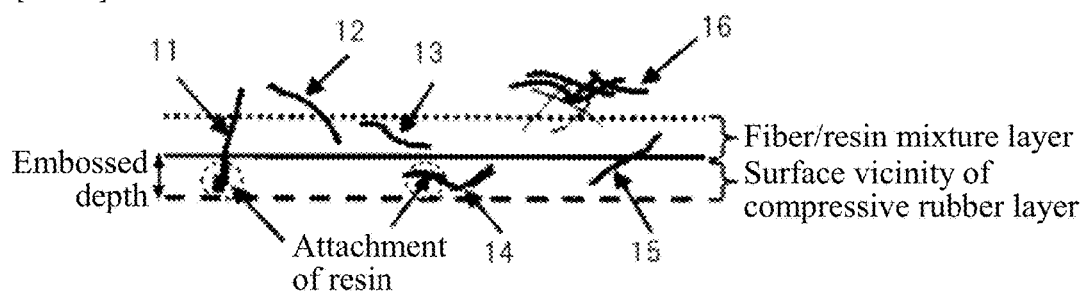
[FIG. 3]
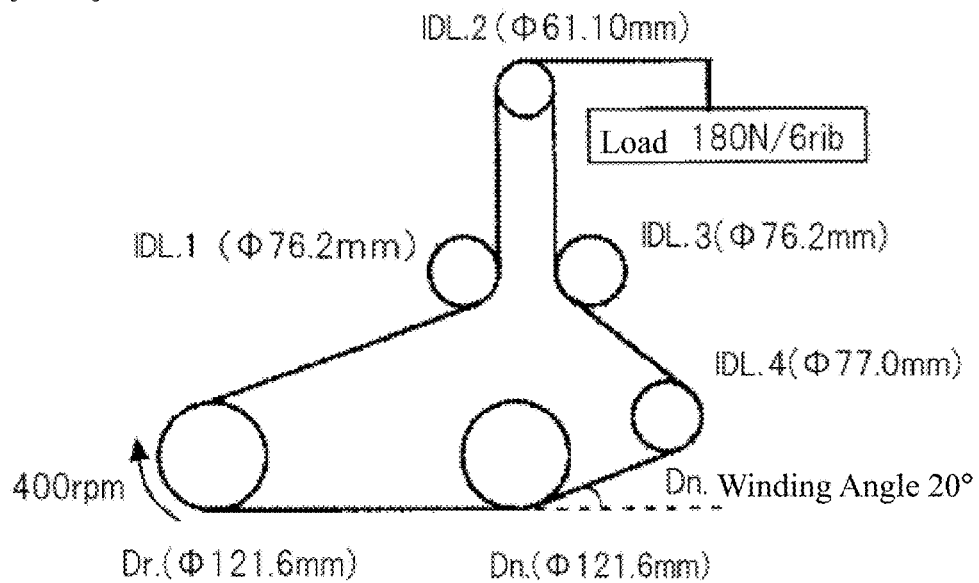

[FIG. 4]
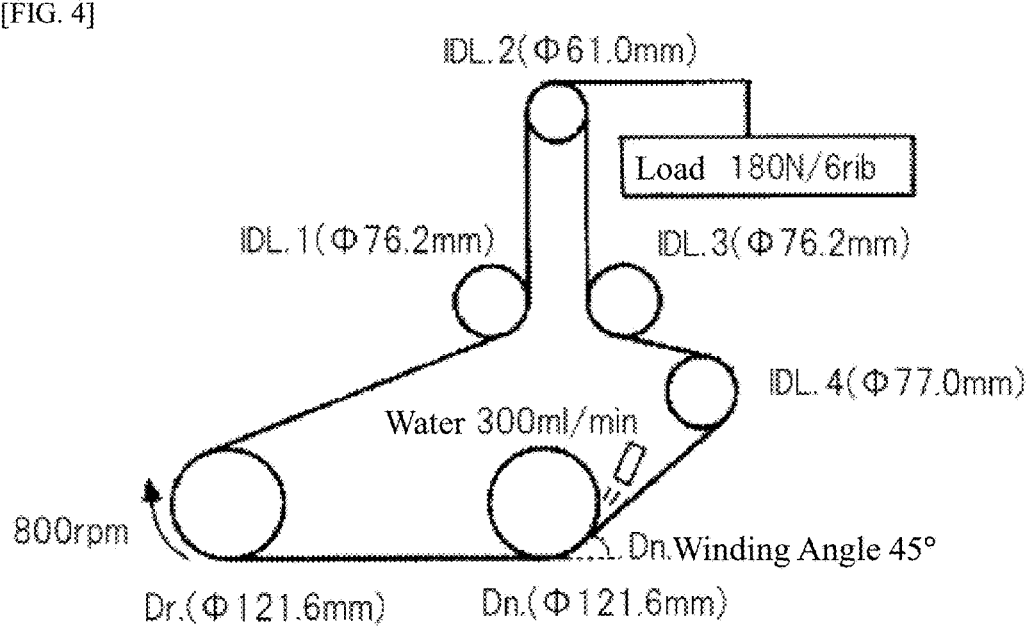
[FIG. 5]
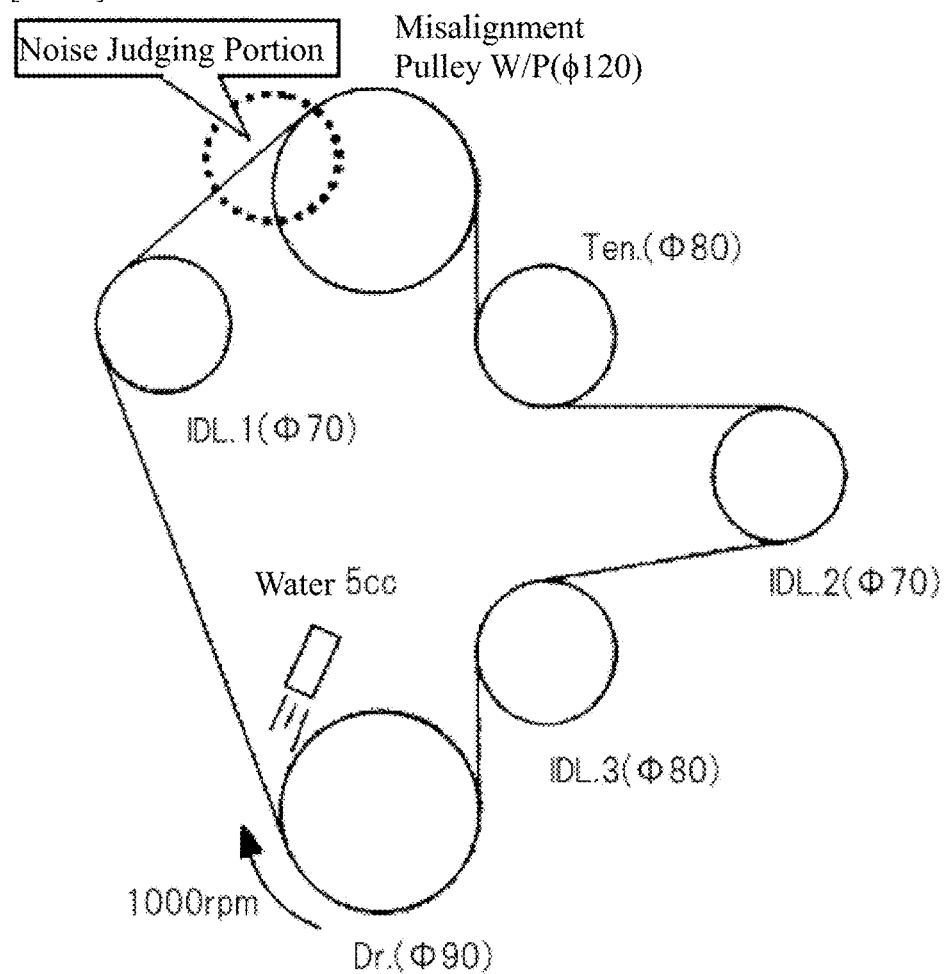

[FIG. 6]
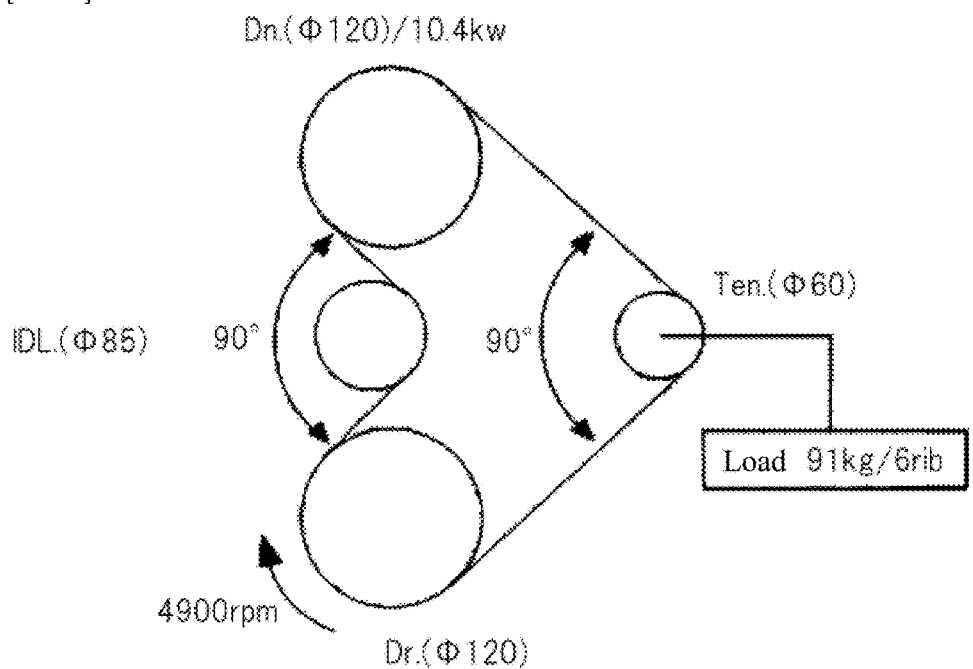
[FIG. 7]
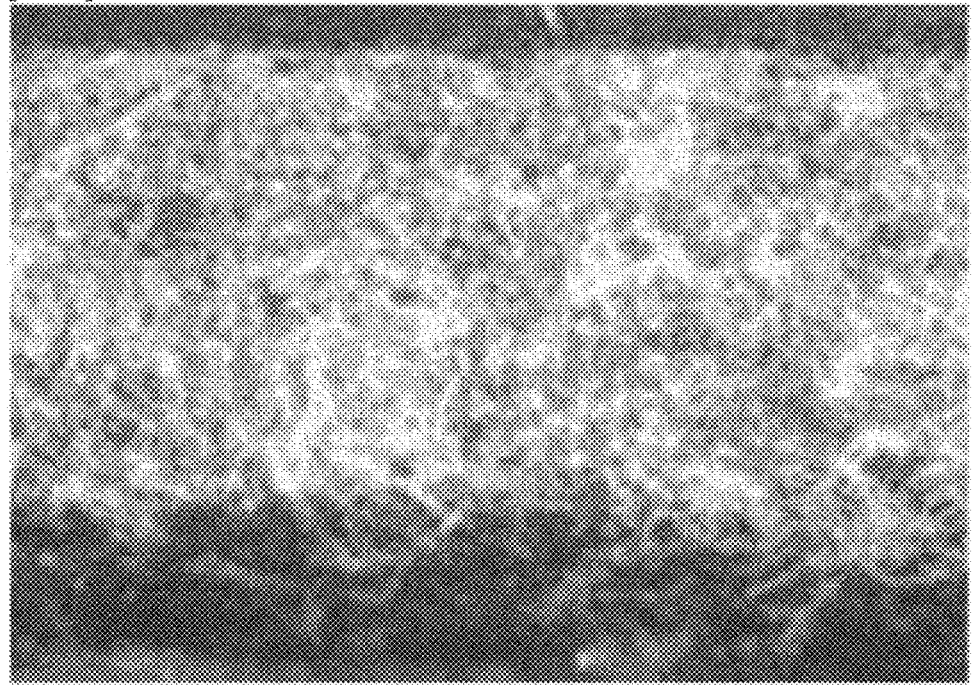

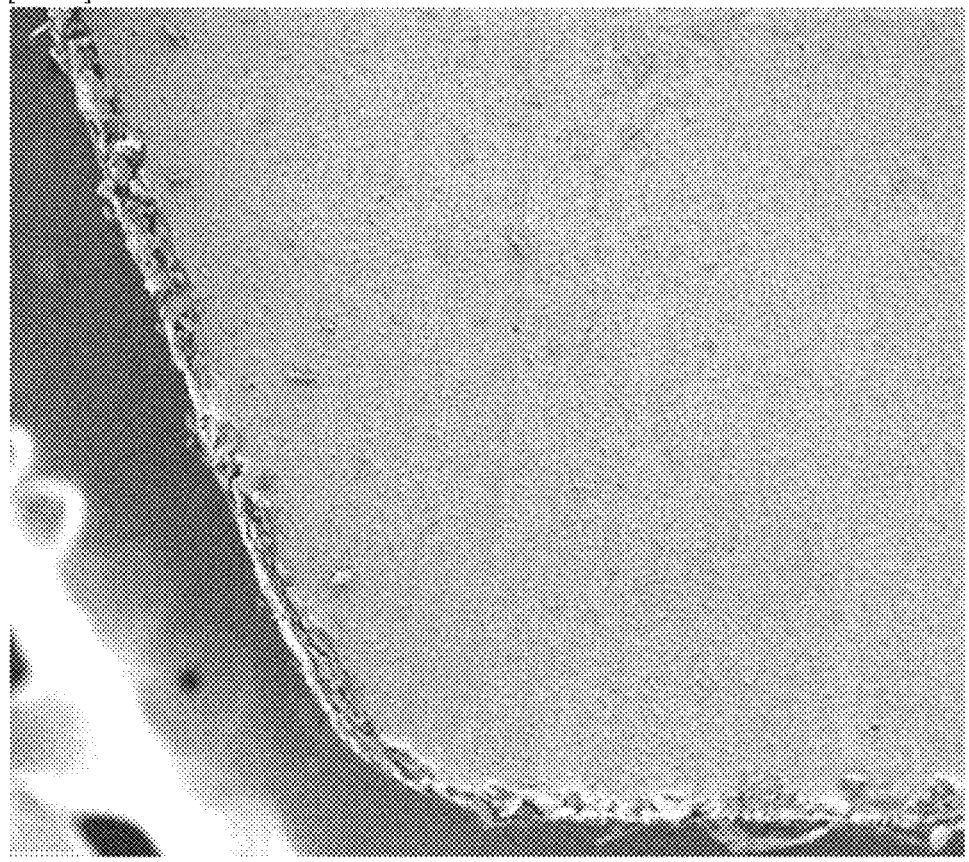
[FIG. 8]

FRICTIONAL POWER TRANSMISSION BELT AND PROCESS FOR PRODUCING SAME

RELATED APPLICATION INFORMATION

This is a divisional of U.S. patent application Ser. No. 14/439,822, filed Apr. 30, 2015, now U.S. Pat. No. 9,695,907, which is a 371 of PCT application PCTJP2013079598, filed Oct. 31, 2013, which claims priority to Japanese Application Nos. 2012-240787 and 2013-171044, filed Oct. 31, 2012 and Aug. 21, 2013, respectively, the entire disclosures of which are incorporated herein by reference.

TECHNICAL FIELD

The present invention relates to a frictional power transmission belt for use for driving automobile engine auxiliary machines and to a method for producing the same, and in detail, it relates to a V-ribbed belt of which frictional power transmission surfaces to be in contact with pulleys are coated with a fiber/resin mixture layer containing a resin component and a heat-resistant fibers, and to a method for producing the same.

BACKGROUND ART

In the field of rubber industry, automobile components are desired to have advanced function and performance. Rubber products for use for such automobile components include power transmission belts and they are widely used, for example, for power transmission of auxiliary drive of automobile air compressors, alternators, etc. In recent years, a severe requirement for silencing is increasing, and in particular, in automobile driving devices, any other sound than engine sound is regarded as a noise, and therefore, a countermeasure to noise generation in belts is demanded.

For example, Patent Document 1 (JP-A 2003-202055) discloses a V-ribbed belt containing ribs each extending in the belt length direction on the lower surface of the belt body, in which each rib contains cotton short fibers and intermediate short fibers having an intermediate elastic modulus between the elastic modulus of the main rubber constituting the ribs and the elastic modulus of the cotton short fibers (see claim 1, paragraph [0009]).

This document describes that the cotton short fibers smooth the change in the friction coefficient accompanied by the transition from the dampened state in absorption of water to a dry state, and that the ribs have a friction coefficient of three or more types including the cotton short fibers, the intermediate short fibers and the main rubber, thereby preventing any drastic stick-slip phenomenon, preventing repetition of slip and adhesion, and preventing noise generation.

However, for preventing the slip phenomenon and the noise generation by the action of the cotton short fibers, the intermediate short fibers and the main rubber, these short fibers must be exposed out of the surface of each rib. For exposing the short fibers out of the surface of each rib, it is necessary to form the ribs by forming an unvulcanized compressive layer, in which the short fibers are kept aligned in the belt width direction, vulcanizing it, and then cutting (grinding) the compressive layer.

Consequently, the production cost for V-ribbed belts increases, and the loss of the rubber material to be caused by cutting brings about another problem.

Given the situation, for reducing the production cost and the loss of the rubber material for such V-ribbed belts, for example, Patent Document 2 (JP-A 2008-281153) discloses a V-ribbed belt in which the plural ribs each extending in the belt length direction on the inner peripheral part thereof comprise unground rubber, the surfaces (frictional power transmission surfaces) of the ribs that are in contact with pulleys have, as flocking to stand thereon, short fibers (flocking yarns) to form a surface fibrous layer, and further, inside the ribs, formed is a flocking rubber layer with the short fibers kept embedded therein, and the thickness of the flocking rubber layer falls within a range of from 35 to 200 μm from the rib surface; and a production method for the same (see claims, paragraphs [0011] and [0023], and Examples). As a method for forming the flocking rubber layer, in this document, a liquid adhesive is applied by means of a spraying method or a dipping method, and short fibers (polyamide, etc.) having a pile length of from 0.1 to 5 mm are electrostatically planted to flock.

This V-ribbed belt is produced as follows. An extensible layer, a tension member, a compressive layer, an adhesive layer (layer of liquid adhesive), and a flocking layer are laminated in this order on an inner mold to form an unvulcanized belt sleeve, then the unvulcanized belt sleeve is pressed against an outer mold having, on the inner side thereof, a rib marking from the inner peripheral side thereof and vulcanized in that condition to produce a rib-marked vulcanized belt sleeve, and the vulcanized belt sleeve is cut into a desired width. According to this production method, the V-ribbed belt may have ribs formed thereon without grinding, and can therefore solve the above-mentioned problem. In addition, this document describes that, in the V-ribbed belt, the surface fibrous layer formed on the frictional power transmission surface thereof prevents noise generation in the initial stage of driving, and the flocking rubber layer formed inside the ribs can prevent noise generation since the short fibers can stay inside the compressive rubber layer even after the belt has run for a long period of time.

However, in adhesive application before flocking in the belt production, the liquid adhesive is applied extremely thinly, and therefore, in forming the rib by pressing the unvulcanized belt sleeve against the rib mark on the outer mold, the compressive rubber layer that has been softened by heating to be in a flowable state would take many flocked short fibers inside it and, as a result, sufficient short fibers could not exist on the surface to be in contact with pulleys (especially near the center part around the rib side surfaces), therefore providing a risk of noise generation in the initial stage.

Patent Document 3 (JP-A 2010-101489) discloses a transmission belt having elastomer teeth of an ethylene-α-olefin elastomer each covered with a barrier layer of a thermoplastic material, in which the barrier layer is covered with an outer cover formed of a woven or nonwoven fabric and the outer side cover on at least the flank of the elastomer teeth is partially included in a part of the thickness of the barrier layer (see claims, and paragraphs [0037], [0039], [0040] and [0051]). This documents describes that the barrier layer prevents the teeth rubber (source material constituting the elastomer teeth) from passing through the cover during belt formation and the cover (fibers or yarns) is partially embedded inside a part of the thickness of the barrier layer to thereby improve the cracking resistance of the barrier layer and, in addition, the remaining part of the cover not embedded is protruded out (exposed out) on the side of pulleys to thereby prevent noise generation. Further, it is disclosed that the barrier layer and the cover are previously integrated through calendering and rolling, and the nonwoven fabric penetrates into the film only partially and can be therefore absolutely prevented from penetrating into the teeth rubber that changes from the raw (unvulcanized) state to a vulcanized state. In addition, the document further discloses that, as the woven or nonwoven fabric to form the cover, especially suitable is a polyethylene-based woven or nonwoven fabric.

However, in this drive belt, the cover is merely embedded only partially inside a part of the thickness of the barrier layer, and with the progress of abrasion along with belt running, only the barrier layer with no cover thereon is to be soon exposed out, and therefore there is also a risk of reduction in the cracking resistance and the abrasion resistance of the barrier layer. In that situation, in addition, since the barrier layer is not reinforced with a cover, the barrier layer would peel off from the surface of the elastomer teeth due to shearing from pulleys or there may be a probability that the barrier layer would break in the inside thereof. Further, though the drive belt uses a peroxide for curing the teeth rubber or any other chemical having curability to thereby promote the bonding between the teeth and the barrier layer, it could not be said that only the chemical action would be sufficient for preventing the barrier layer from peeling off and, in addition, it could not be effective against the destruction inside the barrier layer.

BACKGROUND ART DOCUMENTS

Patent Documents

Patent Document 1: JP-A 2003-202055
Patent Document 2: JP-A 2008-281153
Patent Document 3: JP-A 2010-101489

SUMMARY OF THE INVENTION

Problems that the Invention is to Solve

Accordingly, an object of the present invention is to provide a frictional power transmission belt capable of improving noise suppression and abrasion resistance, and a method for producing the same.

Another object of the present invention is to provide a frictional power transmission belt capable of improving noise suppression when soaked with water, and a method for producing the same.

Still another object of the present invention is to provide a frictional power transmission belt having high productivity and capable of maintaining high noise suppression and abrasion resistance for a long period of time, and a method for producing the same.

Means for Solving the Problems

The present inventors have assiduously studied for the purpose of attaining the above-mentioned objects and, as a result, have found that, when the surface of at least a part to be in contact with pulleys of the compressive rubber layer in a frictional power transmission belt is coated with a fiber/resin mixture layer that contains a resin component and heat-resistant fibers having a softening point or a melting point higher than the vulcanization temperature in a mixed state, and when at least a part of the fibers are embedded so as to extend from the fiber/resin mixture layer to the compressive rubber layer, then the noise suppression and the abrasion resistance can be improved, and they have completed the present invention.

That is, the frictional power transmission belt of the present invention is a frictional power transmission belt containing an extensible layer forming a belt back surface, a compressive rubber layer formed on one surface of the extensible layer and frictionally engaging at the lateral surface thereof with pulleys, and a tension member embedded between the extensible layer and the compressive rubber layer along a belt length direction, in which a surface of at least a part of the compressive rubber layer to be in contact with pulleys is coated with a fiber/resin mixture layer that contains a resin component and heat-resistant fibers having a softening point or a melting point higher than a vulcanization temperature in a mixed state, and a heat-resistant fiber embedded so as to extend from the fiber/resin mixture layer to the compressive rubber layer is contained. In the frictional power transmission belt of the present invention, a resin component may be attached on at least a part of a surface of the heat-resistant fiber embedded in the compressive rubber layer. The heat-resistant fiber embedded in the compressive rubber layer has an embedded depth of preferably from about 5 to 150 µm. The heat-resistant fiber may be exposed out of the surface of the fiber/resin mixture layer. The frictional power transmission belt of the present invention may be a V-ribbed belt in which the heat-resistant fibers are hydrophilic fibers and the compressive rubber layer has plural ribs extending in parallel to each other in the belt length direction. The heat-resistant fibers may contain a long fiber and a short fiber. The resin component may be a thermoplastic resin having a softening point or a melting point of not higher than the vulcanization temperature. The fiber/resin mixture layer may contain a surfactant.

The present invention also includes a production method for producing the frictional power transmission belt of the present invention, in which the method contains a winding step of sequentially winding a sheet for forming the extensible layer, the tension member, an unvulcanized rubber sheet for forming the compressive rubber layer, and a sheet for forming the fiber/resin mixture layer, around a cylindrical drum, and a vulcanization molding step of pressing the wound laminate sheet against a mold to vulcanize and mold the unvulcanized rubber sheet, in which in the vulcanization molding step, the unvulcanized rubber sheet is pre-heated at a temperature lower than the vulcanization temperature and then vulcanized. The sheet for forming the fiber/resin mixture layer may contain a sheet or nonwoven fabric (1) containing a thermoplastic resin having a softening point or a melting point of not higher than the vulcanization temperature, and a nonwoven fabric (2) containing a heat-resistant fiber. At least one selected from the sheet or nonwoven fabric (1) containing a thermoplastic resin having a softening point or a melting point of not higher than the vulcanization temperature and the nonwoven fabric (2) containing a heat-resistant fiber may contain a surfactant. In the winding step, the sheet or nonwoven fabric (1) containing a thermoplastic resin having a softening point or a melting point of not higher than the vulcanization temperature may be arranged on a compressive rubber layer side, and the nonwoven fabric (2) containing a heat-resistant fiber may be arranged to be on a mold side. In the winding step, especially as the sheet for forming the fiber/resin mixture layer, a previously integrated laminate of the sheet or nonwoven fabric (1) containing a thermoplastic resin having a softening point or a melting point of not higher than the vulcanization temperature and the nonwoven fabric (2) containing heat-resistant fibers may be used.

Advantage of the Invention

In the present invention, the surface of at least a part to be in contact with pulleys of the compressive rubber layer in the frictional power transmission belt is coated with a fiber/resin mixture layer that contains a resin component and heat-resistant fibers having a softening point or a melting point higher than a vulcanization temperature in a mixed state, and the fibers contain a fiber embedded so as to extend from the fiber/resin mixture layer to the compressive rubber layer, and therefore the noise suppression and the abrasion resistance can be improved. In addition, when the fibers contain hydrophilic fibers, the noise suppression when soaked with water can be improved. Further, the frictional power transmission belt of the present invention does not require a cutting step, and therefore the productivity thereof is high and, in addition, the noise suppression and the abrasion resistance thereof can be improved for a long period of time.

BRIEF DESCRIPTION OF DRAWINGS

FIG. 1 is a schematic cross-sectional view illustrating one example of a V-ribbed belt.
FIG. 2 is a schematic diagram for explaining the embedded condition of fibers in a fiber/resin mixture layer.
FIG. 3 is a schematic diagram illustrating a layout in a friction coefficient measurement test in ordinary running in Examples.
FIG. 4 is a schematic diagram illustrating a layout in a friction coefficient measurement test in running under soaked with water in Examples.
FIG. 5 is a schematic diagram illustrating a layout in a misalignment noise generation test in Examples.
FIG. 6 is a schematic diagram illustrating a layout in a friction test in Examples.
FIG. 7 is a microscopic picture of a rib side surface (frictional power transmission surface) of the belt obtained in Example 8.
FIG. 8 is a scanning electromicroscopic picture of a rib cross section of the belt obtained in Example 8.

MODE FOR CARRYING OUT THE INVENTION

[Frictional Power Transmission Belt]

The frictional power transmission belt of the present invention is a frictional power transmission belt provided with an extensible layer to form a belt back surface, a compressive rubber layer formed on one surface of the extensible layer and frictionally engaging at the lateral surface thereof with pulleys, and a tension member embedded between the extensible layer and the compressive rubber layer along the belt length direction, in which the surface of at least a part of the compressive rubber layer to be in contact with pulleys is coated with a fiber/resin mixture layer that contains a resin component and heat-resistant fibers having a softening point or a melting point higher than the vulcanization temperature in a mixed state, and the heat-resistant fibers contain a fiber embedded so as to extend from the fiber/resin mixture layer to the compressive rubber layer (especially the surface vicinity of the inside of the compressive rubber layer (the vicinity of the interface to the fiber/resin mixture layer). In the present invention, the surface of at least a part to be in contact with pulleys of the compressive rubber layer (frictional power transmission surface) is coated with a fiber/resin mixture layer containing plural fibers and a resin in a mixed state, and therefore, as compared with a conventional frictional power transmission belt where rubber is exposed out, the friction coefficient of the frictional power transmission surface can be lowered, and therefore noise generation owing to slip or misalignment during belt running can be suppressed.

In the frictional power transmission belt of the present invention, if desired, an adhesive layer may be provided between the compressive rubber layer and the extensible layer for improving the adhesiveness between the tension member and the extensible layer or the compressive rubber layer. The mode of providing the adhesive layer may be a mode where the tension member is embedded therein, or the mode where the tension member is embedded between the compressive rubber layer and the adhesive layer or between the adhesive layer and the extensible layer.

The frictional power transmission belt includes, for example, various types of frictional power transmission belts such as a V-ribbed belt, a raw-edge V-belt, a flat belt, etc. Of those, preferred is a V-ribbed belt and a V-belt for which the production process through grinding is troublesome. Especially preferred is a V-ribbed belt which often provides a problem of noise generation by soaked with water.

FIG. 1 is a schematic cross-sectional view illustrating one example of a V-ribbed belt and a schematic cross-sectional view of cut in the belt width direction.

In this example, the V-ribbed belt is composed of, as laminated in this order from the under surface (inner periphery) of the belt to the top surface (back surface) of the belt, a compressive rubber layer 2 having plural ribs 3, an adhesive layer 6, a tension member 1, and an extensible layer 5 formed of a rubber composition, in which short fibers 4 are aligned in the compressive rubber layer 2 so as to be in a flow state along the shape of each rib therein (in the vicinity of the surface of each rib, the short fibers 4 are in a state aligned along the surface shape of the rib 3). The ribs 3 have, as arranged on the inner peripheral surface of the belt body, ribs 3 extending in plural lines along the length direction of the belt (in FIG. 1, the number of the ribs is 3), and the cross-section shape of the ribs 3 in the direction perpendicular to the length direction is an inverted trapezoid (having a V-shaped cross section) of such that the width thereof is narrowed in the direction from the outer peripheral side of the belt (on the side not having the ribs and not frictionally engaging with pulleys) toward the inner peripheral side thereof (or that is, tapered toward the top). The tension member 1 is embedded inside the belt body along the belt length direction, and a part thereof is in contact with the extensible layer 5 while the remaining part thereof is in contact with the adhesive layer 6. Further, the surface of at least a part to be in contact with pulleys of the compressive rubber layer 2 (the frictional power transmission surface of the ribs 3) is coated with a fiber/resin mixture layer (not illustrated).

(Fiber/Resin Mixture Layer)

The fiber/resin mixture layer may only be formed on at least a part of the frictional power transmission surface to be in contact with pulleys of the compressive rubber layer, but from the viewpoint of productivity, in general, it is formed on the entire surface of the compressive rubber layer. The fiber/resin mixture layer contains heat-resistant fibers having a softening point or a melting point higher than the vulcanization temperature, and a resin component in a mixed state. The heat-resistant fibers are incorporated in the surface of the compressive rubber layer to thereby reinforce the frictional power transmission surface and to lower the friction coefficient thereof. Further, of the heat-resistant fibers in the fiber/resin mixture layer, at least a part of the fibers are embedded so as to extend from the fiber/resin mixture layer to the surface vicinity of the inside of the compressive rubber layer (the vicinity of the interface to the fiber/resin mixture layer). Accordingly, since such the heat-resistant fibers embedded to bridge to both these two layers are contained, the part embedded in the compressive rubber layer plays a role of an anchor effect so that the interface between the fiber/resin mixture layer and the compressive rubber layer can be firmly bonded, and therefore the fiber/resin mixture layer can be thus prevented from peeling away from the compressive rubber layer.

FIG. 2 is a schematic diagram for explaining the embedded condition of the fibers in the fiber/resin mixture layer. As illustrated in FIG. 2, the heat-resistant fibers contained in the fiber/resin mixture layer are embedded therein in various forms. Specifically, the heat-resistant fiber 11 is in such a state where a part thereof is embedded in the surface vicinity of the inside of the compressive rubber layer (the vicinity of the interface to the fiber/resin mixture layer) to the fiber/resin mixture layer while the remaining part thereof is exposed out (or raised out) of the surface of the fiber/resin mixture layer. The heat-resistant fiber 12 is in such a state where a part thereof is embedded in the fiber/resin mixture layer and the remaining part thereof is exposed out of the surface of the fiber/resin mixture layer. The heat-resistant fiber 13 is in such a state where all of it is embedded in the fiber/resin mixture layer. The heat-resistant fiber 14 is in such a state where all of it is embedded in the surface vicinity of the inside of the compressive rubber layer (the vicinity of the interface to the fiber/resin mixture layer). The heat-resistant fiber 15 is in such a state where a part thereof is embedded in the surface vicinity of the inside of the compressive rubber layer (the vicinity of the interface to the fiber/resin mixture layer) and the remaining part thereof is embedded in the fiber/resin mixture layer. The heat-resistant fibers 16 are in such a state where they are kept entangling with the heat-resistant fiber (heat-resistant fiber 11, heat-resistant fiber 12, etc.) that are exposed out of the surface of the fiber/resin mixture layer.

In the present invention, the heat-resistant fibers may only be kept exposed out of the surface of the fiber/resin mixture layer, but are preferably raised out like, for example, the heat-resistant fibers 11, 12 and 16. When the heat-resistant fibers are kept raised out, the friction coefficient of the frictional power transmission surface can be further lowered. The raised fibers (especially the raised fibers of the heat-resistant fibers formed of hydrophilic fibers) can effectively sweep water (water between the compressive rubber layer and pulleys) when soaked with water, to thereby prevent slip and improve noise suppression when soaked with water. Accordingly, it is especially useful for a V-ribbed belt in which the compressive rubber layer has plural ribs extending in parallel to each other in the belt length direction.

Of the heat-resistant fibers mentioned above, the heat-resistant fibers 11, 12, 13 and 15 form the fiber/resin mixture layer by being mixed with the resin component. By covering the surface of the compressive rubber layer with this fiber/resin mixture layer, the friction coefficient of the frictional power transmission surface can be lowered to suppress noise generation. In addition, the heat-resistant fibers contained inside the fiber/resin mixture layer (especially the heat-resistant fiber 13) play a role of reinforcement, and therefore improve the mechanical properties such as the abrasion resistance and cracking resistance of the fiber/resin mixture layer.

Of the heat-resistant fibers 11, 12, 13 and 15 that are at least partly embedded in the fiber/resin mixture layer, the heat-resistant fibers 11 and 15 are embedded also in the surface vicinity of the inside of the compressive rubber layer (the vicinity of the interface to the fiber/resin mixture layer).

By achieving such the embedded state, the heat-resistant fibers 11 and 15 also play a role as an anchor that bonds the fiber/resin mixture layer and the surface layer of the compressive rubber layer so that the interface between the fiber/resin mixture layer and the surface layer of the compressive rubber layer can be thereby firmly bonded to each other. Accordingly, the fiber/resin mixture layer can be prevented from being peeled away from the surface of the compressive rubber layer. In addition, even when the abrasion of the fiber/resin mixture layer goes on so that the surface of the compressive rubber layer is exposed out, the heat-resistant fibers 11, 14 and 15 could be exposed out from the inside through abrasion and could exist like layers in the surface vicinity of the inside of the compressive rubber layer (the vicinity of the interface to the fiber/resin mixture layer) to play a role of reinforcing the compressive rubber layer. Consequently, the compressive rubber layer (frictional power transmission surface) can secure the abrasion resistance even though the belt is run for a long period of time. Specifically, owing to such the fiber/resin mixture layer, the abrasion resistance of the frictional power transmission surface of the frictional power transmission belt of the present invention can be further improved by the two layers of the fiber/resin mixture layer on the outer side (on the side of pulleys) and the layer in the surface vicinity of the inside of the fibers-embedded compressive rubber layer on the inner side of the fiber/resin mixture layer (the layer of the vicinity of the interface to the fiber/resin mixture layer).

The heat-resistant fibers 16 are in a state where they are kept intertwining with a part of the heat-resistant fibers 11 and 12 exposed out of the surface, and are not embedded in the fiber/resin mixture layer. The heat-resistant fibers 16 form a fiber layer that covers at least a part of the fiber/resin mixture layer, to thereby further improve the abrasion resistance. Specifically, in detail, the compressive rubber layer is so configured as to be guarded by three layers of the fiber layer (the layer formed of the fibers exposed out of the surface), the fiber/resin mixture layer, and the layer in the surface vicinity of the inside of the compressive rubber layer (the layer that is the vicinity of the interface to the fiber/resin mixture layer and contains the embedded fibers) in this order from the pulley side. Accordingly, the abrasion resistance and noise suppression of the frictional power transmission surface can be secured for a long period of time.

Of the heat-resistant fibers 11, 14 and 15 at least partly embedded in the surface vicinity of the inside of the compressive rubber layer (the vicinity of the interface to the fiber/resin mixture layer), at least a part of the heat-resistant fibers (e.g., the heat-resistant fibers 11 and 14) may be embedded in the surface vicinity of the inside of the compressive rubber layer (the vicinity of the interface to the fiber/resin mixture layer) in the state with the resin component kept being attached thereto. The frictional power transmission film of the present invention is produced according to the production method to be mentioned below, and therefore, when the heat-resistant fibers are embedded in the surface vicinity of the inside of the compressive rubber layer (the vicinity of the interface to the fiber/resin mixture layer) at the time of forming ribs, the resin component may attach to the surfaces of the heat-resistant fibers. When the resin component is attached to the surfaces of the heat-resistant fibers embedded in the compressive rubber layer, the heat-resistant fibers and the material to form the compressive rubber layer (e.g., rubber composition) can be firmly bonded to each other via the resin component therebetween. Specifically, the close contact (adhesiveness) between the two can be improved and therefore the heat-resistant fibers can be prevented from dropping off (removing away) and the fiber/resin mixture layer can be more surely prevented from peeling away from the surface of the compressive rubber layer. Further, the heat-resistant fibers can be firmly fixed to the compressive rubber layer and therefore, even when the fiber/resin mixture layer is worn away through the progress of abrasion, the heat-resistant fibers can be prevented from dropping away from the surface vicinity of the inside of the compressive rubber layer (the vicinity of the interface to the fiber/resin mixture layer). Consequently, the abrasion resistance and noise suppression of the surface layer of the compressive rubber layer (the frictional power transmission surface) can be thereby secured for a long period of time.

The embedded depth of the heat-resistant fibers embedded in the compressive rubber layer (the thickness of the fiber/rubber mixture layer formed in a layer form by the heat-resistant fibers embedded in the surface vicinity of the inside of the compressive rubber layer (the vicinity of the interface to the fiber/resin mixture layer)) is, for example, from 5 to 150 μm, preferably from 10 to 100 μm, more preferably from 15 to 80 μm (especially preferably from 20 to 60 μm) or so, from the viewpoint that the heat-resistant fibers can be prevented from dropping off from the surface vicinity of the inside of the compressive rubber layer (from the vicinity of the interface to the fiber/resin mixture layer) and that the fiber/resin mixture layer can be prevented more surely from peeling from the surface layer of the compressive rubber layer. When the embedded depth of the heat-resistant fibers is too shallow, the heat-resistant fibers would readily drop off so that it would be impossible to sufficiently prevent the fiber/resin mixture layer from peeling away from the surface layer of the compressive rubber layer, while on the other hand, when the embedded depth of the heat-resistant fibers is too deep, the thickness of the heat-resistant fibers to be embedded would be large and, as a result, when the belt is inversely bend by pulleys so that the ribs are extended, the rib surfaces would be readily cracked and the belt life would be shortened. In the frictional power transmission belt of the present invention, the fiber/rubber mixture layer is formed to have a nearly uniform thickness in the surface vicinity of the inside of the compressive rubber layer (the vicinity of the interface to the fiber/resin mixture layer).

The thickness of the fiber/resin mixture layer is, for example, from 5 to 150 μm, preferably from 10 to 120 μm, more preferably from 20 to 100 μm or so. When the fiber/resin mixture layer is too thin, the cracking resistance and abrasion resistance would worsen, but when too thick, the flexibility of the fiber/resin mixture layer would lower.

In this description, the embedded depth of the fibers and the thickness of the fiber/resin mixture layer can be measured on a scanning electron microscopic picture (SEM), in which the data at arbitrary 5 or more sites are averaged. In detail, they may be measured according to the method described in the section of Examples given hereinunder.

(1) Heat-Resistant Fibers

The heat-resistant fibers may contain long fibers, and may be fibers formed of long fibers alone, but preferably contain at least short fibers. Further, the heat-resistant fibers may contain different types of heat-resistant fibers (plural types of heat-resistant fibers).

The heat-resistant fibers may only have a softening point or a melting point higher than a vulcanization temperature (e.g., from 150 to 200° C., especially about 170° C.) for retaining the fibrous form after vulcanization and imparting various functions to the belt, and various types of synthetic fibers and inorganic fibers can be used. The softening point or melting point (or decomposition point) of the heat-resistant fibers may be, for example, T+10° C. or more when the vulcanization temperature is taken as T, and may be, for example, from (T+10) to (T+400)° C., preferably from (T+20) to (T+370)° C., more preferably from (T+20) to (T+350)° C. or so. The heat-resistant fibers have a softening point or a melting point higher than the vulcanization temperature, and therefore even after vulcanized, they can still maintain the fibrous form and can impart desired properties (as reflecting the characteristics of the heat-resistant fibers) to the frictional power transmission surface.

The heat-resistant fibers include, for example, heat-resistant fibers conventionally used for frictional power transmission belts, for example, natural fibers (cellulosic fibers such as cotton, hemp or rayon fibers, etc.); synthetic fibers [aliphatic polyamide fibers (polyamide 6, polyamide 66, polyamide 46 fibers, etc.), polyester fibers (poly-$C_{2-4}$ alkylene-$C_{6-14}$ arylate fibers such as polybutylene terephthalate, polyethylene terephthalate, polyethylene naphthalate fibers, etc.), fluorine fibers (polytetrafluoroethylene fibers, etc.), polyacrylic fibers (polyacrylonitrile fibers, etc.), polyvinyl alcohol fibers, polyphenylene sulfide (PPS) fibers, poly-p-phenylene benzobisoxazole (PBO) fibers, aromatic polyamide fibers (p-aramid, m-aramid fibers, etc.), etc.]; inorganic fibers (carbon fibers, glass fibers, etc.), etc. These heat-resistant fibers may be used either singly or in combination of two or more thereof.

These heat-resistant fibers may be suitably selected depending on the required properties and, for example, in case where the heat-resistant fibers are used for improving the water absorption (hydrophilicity) of the surfaces of ribs and for maintaining the transmission performance and preventing noise generation when soaked with water, preferred is use of hydrophilic fibers having high affinity with water (hydrophilicity) (especially, cellulosic fibers such as cotton, rayon fibers, etc.). On the other hand, for improving the abrasion resistance of the frictional power transmission surface, preferred is use of fibers having a high modulus of elasticity, such as aliphatic polyamide fibers (nylon fibers), aromatic polyamide fibers (aramid fibers), polyester fibers, PBO fibers or the like, as the heat-resistant fibers. Further, for reducing the friction coefficient of the frictional power transmission surface, for example, preferred is use of fluorine fibers as the heat-resistant fibers. For imparting plural functions, plural types of heat-resistant fibers may be used in combination.

The fibrous form of the heat-resistant fibers is not specifically limited, and may be in any form of a monofilament, a multifilament, a spun yarn or the like, or may be in a combined form of these.

The heat-resistant fibers may be any of short fibers and long fibers, but preferably contain at least short fibers. The mean length of the short fibers is, for example, from 1 to 500 mm, preferably from 2 to 300 mm, more preferably from 3 to 200 mm (especially from 5 to 100 mm) or so. Further, from the viewpoint that the embedded depth of the heat-resistant fibers in the compressive rubber layer can be controlled, especially preferred is combined use of long fibers and short fibers. When long fibers and short fibers are combined, then it may be presumed that the short fibers having a higher degree of freedom in the fiber/resin mixture layer would be bound by the long fibers therein and many of the short fibers would be prevented from being taken in the compressive rubber layer. The ratio (by mass) of the long fibers to the short fibers may be, as long fibers/short fibers, from 1/99 to 90/10, preferably from 5/95 to 50/50, more preferably from 10/90 to 40/60 or so. When the proportion of the long fibers is too large, then it would be difficult to make the fibers exist in the surface of the fiber/resin mixture layer or in the interface to the compressive rubber layer; but when too small, then the proportion of the short fibers embedded in the compressive rubber layer would readily increase too much.

Preferably, the long fibers are arranged along the belt length direction, as capable of preventing many of the short fibers from being taken in the compressive rubber layer, and further, a nonwoven fabric can easily be wound in the belt production. In addition, in the case, the direction in which the ribs extend and the direction in which the long fibers are arranged could be the same, and therefore even when the fibers are formed of a poorly-elastic material, a suitable rib form can be still maintained.

The mean fiber diameter of the heat-resistant fibers is, for example, 5 to 50 μm, preferably from 7 to 40 μm, more preferably from 10 to 35 μm or so.

For the purpose of improving the adhesiveness thereof to the compressive rubber layer, the heat-resistant fibers may be subjected to an adhesion treatment, in the stage of the raw material. As for the adhesion treatment, they may be treated by immersing in a resin-based processing liquid of an epoxy or isocyanate compound dissolved in an organic solvent (toluene, xylene, methyl ethyl ketone, etc.), or may be treated by immersing in a processing liquid of a resorcinol-formalin-latex liquid (RFL liquid), etc. For the purpose of imparting adhesiveness between the heat-resistant fibers and the component to form the compressive rubber layer and/or imparting the performance of the frictional power transmission surface, for example, a rubber composition may be dissolved in the above-mentioned organic solvent to prepare a rubber paste, and the raw material of the heat-resistant fibers (nonwoven fabric, etc.) may be treated by immersing in the resultant rubber paste so as to infiltrate and adhere the rubber composition to the heat-resistant fibers. These treatments may be carried out singly or in combination, and the treatment frequency and the treatment order are not specifically limited and may be conducted with suitable changes.

(2) Resin Component

The resin component may be any one capable of expressing a role like a binder for the heat-resistant fibers to form a fiber/resin mixture layer, and capable of adhering also to the surfaces of the fibers to be embedded in the compressive rubber layer to thereby improve the close contact between the fiber/resin mixture layer and the compressive rubber layer. In general, a thermoplastic resin is used, but a thermosetting resin that may melt at the vulcanization temperature is also usable.

Preferably, the melting point (or softening point) of the resin component is not higher than the vulcanization temperature (e.g., from 150 to 200° C., especially about 170° C.). The material thereof is not specifically limited, but from the viewpoint of the handleability and the general versatility thereof, preferred is an olefinic resin such as a polyethylene resin, a polypropylene resin, etc. Further, of the olefinic resin, more preferred is polyethylene (especially low-density polyethylene) from the viewpoint of the easiness of melting. These resins may be used either singly or in combination of two or more types thereof.

The softening point or the melting point of the resin component is, for example, when the vulcanization temperature is taken as T, from (T−100) to T° C., preferably from (T−80) to (T−5)° C., more preferably from (T−50) to (T−10)° C. or so.

Not specifically limited, the form of the resin component may only be any one capable of filling up the space between the fibers and capable of adhering to the surfaces of the fibers. As described below, however, in case where a fibrous raw resin material is used and even when it is a thermoplastic resin having a melting point (or softening point) not higher than the vulcanization temperature, the fibrous form thereof would partly remain as such. In the present invention, in the case where a fibrous resin of not higher than the vulcanization temperature is used as a raw material, the component in which the fibrous form thereof partly remains as such after vulcanization, is not grouped in the category of the heat-resistant fibers but in the category of the resin component.

The resin component may be subjected to the same adhesion treatment (or surface treatment) as that for the heat-resistant fibers.

The ratio (by mass) of the resin component to the heat-resistant fibers may be, as resin component/heat-resistant fibers, selected from a range of from 99/1 to 1/99 or so, for example, from 95/5 to 5/95, more preferably from 85/15 to 15/85, even more preferably from 75/25 to 25/75 (especially from 70/30 to 30/70) or so. When the resin component and the heat-resistant fibers are combined in the ratio as above, the surface of the compressive rubber layer may be covered with the fiber/resin mixture layer and at least a part of the heat-resistant fibers may be embedded so as to extend from the fiber/resin mixture layer to the surface vicinity of the inside of the compressive rubber layer (the vicinity of the interface to the fiber/resin mixture layer).

(3) Surfactant

The fiber/resin mixture layer may further contain a surfactant. When the fiber/resin mixture layer contains a surfactant, the surfactant may bleed out on the frictional power transmission surface to form a film (surfactant layer) thereon, whereby the wettability with water of the frictional power transmission surface can be improved and the ability of the raised heat-resistant fibers to sweep out water as well as the water absorbability (hydrophilicity) of the surfaces of the ribs can be thereby improved further more. In particular, in ordinary running (in dry), the surfactant layer can act as a lubricant layer whereby the friction coefficient between pulleys and the frictional power transmission surface is lowered, while on the other hand, in running with being soaked with water (in wet), water will spread over the frictional power transmission surface so that the water film can be more efficiently removed by the heat-resistant fibers (especially hydrophilic fibers) and the lowering of the friction coefficient due to the water film can be thereby prevented. Accordingly, the difference in the friction coefficient between the dry state and the wet state can be reduced, and the noise generation owing to misalignment when soaked with water can be therefore prevented.

The surfactant includes ionic surfactants and nonionic surfactants. The ionic surfactant includes, for example, anionic surfactants such as alkylbenzenesulfonate salts, α-olefinsulfonate salts, long-chain fatty acid salts, alkanesulfonate salts, alkylsulfate salts, polyoxyethylene alkyl ether sulfate ester salts, naphthalenesulfonic acid/formalin condensates, alkylphosphate salts, etc.; cationic surfactants such as alkyltrimethylammonium salts, dialkyldimethylammonium salts, etc.; ampholytic surfactants such as alkylbetaines, imidazoline derivatives, etc. The nonionic surfactant includes, for example, polyethylene glycol-type (polyoxyethylene-type) nonionic surfactants, polyalcohol-type nonionic surfactants, etc. These surfactants may be used either singly or in combination of two or more thereof. Of those, preferred are nonionic surfactants (especially polyethylene glycol-type nonionic surfactants), from the viewpoint that they are excellent in affinity with the heat-resistant fibers and to the resin component and are excellent also in affinity with water.

The polyethylene glycol-type nonionic surfactants include, for example, poly-EO higher alcohol ethers (poly-EO $C_{10-26}$ alkyl ethers such as poly-EO lauryl ether, poly-EO stearyl ether, etc.), poly-EO-poly-PO higher alcohol ethers (e.g., poly-EO-poly-PO $C_{10-26}$ alkyl ethers); alkylphenol-EO adducts such as poly-EO octylphenyl ether, poly-EO nonylphenyl ether, etc.; fatty acid-EO adducts such as poly-EO monolaurate, poly-EO monooleate, poly-EO monostearate, etc.; glycerin mono or di-higher fatty acid ester-EO adducts (EO adducts of glycerin mono or di-$C_{10-26}$ fatty acid esters such as glycerin mono or dilaurate, glycerin mono or dipalmitate, glycerin mono or distearate, glycerin mono or dioleates, etc.), pentaerythritol higher fatty acid ester-EO adducts (pentaerythritol mono to tri-$C_{10-26}$ fatty acid ester-EO adducts such as pentaerythritol distearate-EO adduct, etc.), dipentaerythritol higher fatty acid ester-EO adducts; sorbitol higher fatty acid ester-EO adducts, sorbit higher fatty acid ester-EO adducts; sorbitan fatty acid ester-EO adducts such as poly-EO sorbitan monolaurate, poly-EO sorbitan monostearate, poly-EO sorbitan tristearates, etc.; polyalcohol fatty acid ester-EO adducts such as sucrose higher fatty acid ester-EO adducts, etc.; higher alkylamine-EO adducts such as poly-EO laurylaminoether, poly-EO stearylaminoether, etc.; fatty acid amide-EO adducts such as poly-EO coconut fatty acid monoethanolamides, poly-EO lauric acid monoethanolamides, poly-EO stearic acid monoethanolamides, poly-EO oleic acid monoethanolamides, etc.; fat-EO adducts such as poly-EO castor oil, poly-EO hardened castor oil, etc.; poly-PO-EO adducts (poly-EO-poly-PO block copolymers, etc.), etc. These polyethylene glycol-type nonionic surfactants may be used either singly or in combination of two or more thereof. In the above-mentioned exemplification of surfactants, "oxyethylene", "ethylene oxide" or "ethylene glycol" is represented by "EO"; and "oxypropylene" "propylene oxide" or "propylene glycol" is represented by "PO".

The polyalcohol-type nonionic surfactants include, for example, glycerin fatty acid esters such as glycerin monostearate, glycerin monooleate, etc.; pentaerythritol fatty acid esters such as pentaerythritol monostearate, pentaerythritol di-tallowate ester, etc.; sorbitan fatty acid esters such as sorbitan monolaurate, sorbitan monostearate, etc.; sorbitol fatty acid esters such as sorbitol monostearate, etc.; sucrose fatty acid esters, polyalcohol alkyl ethers; fatty acid amides of alkanolamines such as coconut fatty acid diethanolamides, etc.; alkyl-polyglycosides, etc. These polyalcohol-type nonionic surfactants may be used either singly or in combination of two or more thereof, or may be used in combination with the above-mentioned polyethylene glycol-type nonionic surfactant.

HLB (hydrophilicity-lipophilicity balance) of the surfactants may be, for example, from 5 to 15 (especially from 7 to 15) or so, from the viewpoint of the affinity thereof with the heat-resistant fibers and the resin component.

The melting point of the surfactant is preferably lower from the viewpoint of easy handleability thereof and capability of bleeding out easily, and the lower limit thereof is not specifically limited. The melting point of the surfactant is preferably not higher than room temperature, and is, for example, 20° C. or lower (e.g., from −40° C. to 20° C.), preferably from −35° C. go 15° C. (e.g., from −30° C. to 10° C.), more preferably from −35° C. to 5° C. or so, and may be generally 0° C. or lower (e.g., from −35° C. to −5° C.) or so.

The proportion of the surfactant is, relative to the whole of the fiber/resin mixture layer, from 0.1 to 50% by mass, preferably from 0.5 to 30% by mass, more preferably from 1 to 20% by mass (especially from 1.5 to 10% by mass) or so. When the proportion of the surfactant is too small, the effect of improving the ability of the raised heat-resistant fibers to sweep out water and the water absorbability of the surfaces of the ribs may lower, but when too large, the mechanical properties of the fiber/resin mixture layer may worsen.

(Compressive Rubber Layer)

The compressive rubber layer can be suitably selected depending on the type of the belt, and usable is, for example, a rubber composition containing a rubber component and a vulcanizing agent or a crosslinking agent, or a polyurethane resin composition.

As the rubber component, examples thereof include a vulcanizable or crosslinkable rubber including, for example, dienic rubber (natural rubber, isoprene rubber, butadiene rubber, chloroprene rubber, styrene-butadiene rubber (SBR), acrylonitrile-butadiene rubber (nitrile rubber), hydrogenated nitrile rubber, mixed polymer of hydrogenated nitrile rubber and unsaturated carboxylic acid metal salt, etc.), ethylene-α-olefin elastomer, chlorosulfonated polyethylene rubber, alkylated chlorosulfonated polyethylene rubber, epichlorohydrin rubber, acrylic rubber, silicone rubber, urethane rubber, fluorine rubber, etc.

The polyurethane composition includes, for example, a cured product of an urethane prepolymer with a curing agent (two-pack curable polyurethane), etc.

Of those, preferred is a case of forming a rubber composition containing sulfur or an organic peroxide (especially, an organic peroxide-curable rubber composition) into an unvulcanized rubber layer, and vulcanizing or crosslinking the unvulcanized rubber layer. Especially preferred is an ethylene-α-olefin elastomer (ethylene-α-olefinic rubber), as excellent in adhesiveness in a case where an olefinic resin is used as the resin component, not containing any harmful halogen, having ozone resistance, heat resistance and cold resistance, and excellent in economic efficiency.

The rubber composition generally contains a vulcanizing agent or a crosslinking agent (especially organic peroxide), a vulcanization accelerator, or a co-crosslinking agent (crosslinking aid, or co-vulcanizing agent). The proportion of the vulcanizing agent or the crosslinking agent is, relative to 100 parts by mass of the rubber component, from 1 to 10 parts by mass (especially from 2 to 5 parts by mass) or so in terms of the solid content thereof. The proportion of the vulcanization accelerator is, in terms of the solid content thereof and relative to 100 parts by mass of the rubber component, for example, from 0.5 to 15 parts by mass (especially from 2 to 5 parts by mass) or so. The proportion of the crosslinking aid is, in terms of the solid content thereof and relative to 100 parts by mass of the rubber component, for example, from 0.01 to 10 parts by mass (especially from 0.1 to 5 parts by mass) or so.

The rubber composition may contain short fibers. As the short fibers, usable are the same fiber as the heat-resistant fibers as mentioned above. Those short fibers may be used either singly or in combination of two or more thereof. Of those fibers, widely used are cellulosic fibers such as cotton or rayon, polyester fibers (PET fibers, etc.), polyamide fibers (aliphatic polyamide fibers such as polyamide 6, etc., aramid fibers, etc.), etc.

The mean fiber length of the short fibers may be, for example, from 1 to 20 mm, preferably from 2 to 15 mm, more preferably from 3 to 10 mm or so. The mean fiber diameter of the short fibers is, for example, from 5 to 50 µm, preferably from 7 to 40 µm, more preferably from 10 to 30 µm or so. The proportion of the short fibers is, relative to 100 parts by mass of the rubber component, for example, from 1 to 50 parts by mass (especially from 10 to 35 parts by mass) or so.

If desired, the rubber composition may contain any ordinary additive, for example, a vulcanization aid, a vulcanization accelerator, a vulcanization retardant, an augmenting agent, a filler, a metal oxide, a softener, a processing agent or a processing aid, an anti-aging agent, a colorant, a tackifier, a plasticizer, a coupling agent, a stabilizer, a lubricant, a flame retardant, an antistatic agent, etc.

The thickness of the compressive rubber layer can be suitably selected depending on the type of the belt. In the case of a V-ribbed belt, for example, it is from 2 to 25 mm, preferably from 2.2 to 16 mm, more preferably from 2.5 to 12 mm or so.

(Tension Member)

As the fibers constituting the tension member, there are exemplified the same fibers as the above-mentioned heat-resistant fibers. Of those, widely used are synthetic fibers such as polyester fibers, aramid fibers, etc., and inorganic fibers such as glass fibers, carbon fibers, etc., from the viewpoint of the high modulus thereof. Especially preferred are polyester fibers and aramid fibers as capable of lowering the belt slip ratio. The polyester fibers may be multifilament yarns. The fineness of the tension member composed of multifilament yarns may be, for example, from 2,000 to 10,000 denier (especially from 4,000 to 8,000 denier) or so. For the purpose of improving the adhesiveness thereof to the rubber component, the tension member may be subjected to an ordinary adhesion treatment, for example, adhesion treatment with a resorcinol-formalin-latex liquid (RFL liquid).

As the tension member, in general, usable is a twisted cord formed of multifilament yarns (e.g., double-twist, single-twist or Lang's lay). The mean wire diameter of the tension member (fiber diameter of twisted cord) may be, for example, from 0.5 to 3 mm, preferably from 0.6 to 2 mm, more preferably from 0.7 to 1.5 mm or so. The tension member is embedded in the length direction of the belt, and may be arranged in parallel at a predetermined pitch parallel to the length direction of the belt.

(Adhesive Layer)

The same rubber composition as that for the above-mentioned compressive rubber layer can be used for the adhesive layer. In the rubber composition of the adhesive layer, the rubber component is, in many cases, of the same type or the same series as that of the rubber of the rubber component in the rubber composition for the above-mentioned compressive rubber layer. Further, the proportion of the additive, such as the vulcanizing agent or the crosslinking agent as well as the co-crosslinking agent or the crosslinking aid, the vulcanization accelerator or the like may also be selected from the same range as that in the rubber composition for the compressive rubber layer. The rubber composition for the adhesive layer may further contain an adhesiveness improver (resorcinol-formaldehyde co-condensate, amino resin, etc.).

The thickness of the adhesive layer may be suitable selected depending on the type of the belt. In the case of a V-ribbed belt, it is, for example, from 0.4 to 3.0 mm, preferably from 0.6 to 2.2 mm, more preferably from 0.8 to 1.4 mm or so.

(Extensible Layer)

The extensible layer may be formed of the same rubber composition as that for the above-mentioned compressive rubber layer, and may be formed of a fabric (reinforcing fabric) such as a canvas fabric, etc.

The reinforcing fabric includes, for example, a fabric material such as a woven fabric, a wide-angle canvas fabric, a knitted cloth, a nonwoven fabric, etc. Of those, preferred are a woven fabric that is woven in a mode of plain weaving, twilling, sateen weaving or the like, and a wide-angle canvas fabric or a woven fabric in which the crossing angle between the warp and the weft is from 90 to 120° or so. As the fibers constituting the reinforcing fabric, use can be made of the same fibers as the above-mentioned short fibers. The reinforcing fabric may be treated with the above-mentioned RFL liquid (immersion treatment, etc.) followed by rubbing a rubber composition through friction or lamination (coating) to form a canvas fabric with rubber.

Of the above, preferred is an extensible layer formed of a rubber composition. In the rubber composition for the extensible layer, the rubber component is, in many cases, of the same type or the same series as that of the rubber component in the rubber composition for the above-mentioned compressive rubber layer. The proportion of the additive, such as the vulcanizing agent or the crosslinking agent as well as the co-crosslinking agent or the crosslinking aid, the vulcanization accelerator or the like may also be selected from the same range as that in the rubber composition for the compressive rubber layer.

The rubber composition may contain the same short fibers as in the compressive rubber layer, for the purpose of preventing noise generation owing to the adhesion of the back rubber during driving on the back. The short fibers may be oriented randomly in the rubber composition. Further, the short fibers may be short fibers bent partially.

Further, for preventing noise generation during driving on the back, the surface of the extensible layer (the back of the belt) may have a concavo-convex pattern provided. The concavo-convex pattern includes a knitted fabric pattern, a woven fabric pattern, a bamboo blind-like woven pattern, an embossed pattern, etc. Of those patterns, preferred are a woven fabric pattern and an embossed pattern. Further, at least a part of the back of the extensible layer may be covered with the above-mentioned fiber/resin mixture layer.

The thickness of the extensible layer can be suitably selected depending on the type of the belt. In the case of a V-ribbed belt, for example, it is from 0.4 to 2 mm, preferably from 0.5 to 1.5 mm, more preferably from 0.7 to 1.2 mm or so.

[Method for Producing Frictional Power Transmission Belt]

The frictional power transmission belt of the present invention can be produced through a winding step of sequentially winding a sheet for forming an extensible layer (sheet for extensible layer), a tension member, an unvulcanized rubber sheet for forming a compressive rubber layer (sheet for compressive rubber layer), and a sheet for forming a fiber/resin mixture layer (sheet for fiber/resin mixture layer), around a cylindrical drum, and a vulcanization molding step of pressing the wound laminate sheet against a mold to vulcanize and mold the unvulcanized rubber sheet.

Specifically, in the winding step, first, the unvulcanized sheet for extensible layer is wound around an inner mold equipped with a flexible jacket around the outer periphery thereof, then a tension member is helically spun thereover, and further the unvulcanized sheet for compressive rubber layer and the sheet for fiber/resin mixture layer are sequentially wound therearound to produce a shaped body.

In this step, the sheet for fiber/resin mixture layer may only contain heat-resistant fibers and a resin for forming the fiber/resin mixture layer. The heat-resistant fibers (heat-resistant fibers as a raw material for the fiber/resin mixture layer) may be used in any form of a woven fabric, a knitted fabric, a nonwoven fabric, etc., but is preferably in a form of a nonwoven fabric. The weight (weight per area) of the nonwoven fabric containing heat-resistant fibers is not specifically limited, and may be, for example, from 10 to 80 g/m$^2$ (especially from 20 to 60 g/m$^2$) or so.

In the sheet for fiber/resin mixture layer, the resin component (raw material for resin component for fiber/resin mixture layer) includes, for example, a pellet material, a sheet (film) material, a fibrous (nonwoven fabric) material, etc. Of those, preferred are a sheet (film) material and a fibrous (nonwoven fabric) material, and more preferred is a fibrous material. The fibrous resin component can further improve the close contact between the heat-resistant fibers and the compressive rubber layer probably because the fibers are entangled with heat-resistant fibers.

The fibrous resin component may be composed of a single resin component, or may contain composite fibers formed of at least two materials, such as one having a bimetal structure (conjugate fibers: fibers described in JP-A 2002-39275, etc.) or one having a core/sheath structure. In the core/sheath structure, the sheath part may only be formed of a thermoplastic resin (polyethylene, etc.), and the core part may be thermoplastic resin (polypropylene, etc.) or any other material, for example, heat-resistant fibers.

The fiber morphology of the fibrous resin component is not specifically limited, and may be any morphology of monofilament, multifilament or spun yarn, or may be a combination of them.

The fibrous resin component may be any of short fibers and long fibers. The mean fiber diameter is, for example, from 5 to 50 μm, preferably from 7 to 40 μm, more preferably from 10 to 35 μm or so. In the case of short fibers, the mean length is, for example, from 1 to 500 mm, preferably from 2 to 300 mm, more preferably from 3 to 200 mm (especially from 5 to 100 nm) or so.

The fibrous resin component may also be used in any form of a woven fabric, a knitted fabric, a nonwoven fabric or the like, but preferred is a form of a nonwoven fabric. The weight (weight per area) of the nonwoven fabric formed of the fibrous resin component is not specifically limited, and is, for example, from 10 to 80 g/m$^2$ (especially from 20 to 60 g/m$^2$) or so.

Further, in case where the fibrous resin component is a nonwoven fabric, the nonwoven fabric may be formed of the fibrous resin component alone, or may also be a nonwoven fabric formed through fiber blending with heat-resistant fibers (fiber-blended nonwoven fabric formed of a fibrous resin component and heat-resistant fibers in a state of being randomly entangled with each other). In particular, in the fiber-blended nonwoven fabric, the fibrous resin component and heat-resistant fibers are entangled with each other in the stage of raw materials thereof, and therefore the resin component can readily adhere to the surfaces of the heat-resistant fibers in a large surface area. The proportion of the fibrous resin component in the nonwoven fabric containing heat-resistant fibers is not specifically limited so far as the proportion of the resin component in the fiber/resin mixture layer falls within the above-mentioned range, and may be, for example, from 1 to 75% by mass relative to the whole of the nonwoven fabric containing heat-resistant fibers, preferably from 5 to 70% by mass, more preferably from 10 to 65% by mass or so.

The sheet for fiber/resin mixture layer preferably contains (1) a sheet or nonwoven fabric containing a thermoplastic resin (a sheet formed of a thermoplastic resin or a nonwoven fabric formed of a thermoplastic resin) and (2) a nonwoven fabric containing heat-resistant fibers. The sheet or nonwoven fabric (1) containing a thermoplastic resin and the nonwoven fabric (2) containing heat-resistant fibers may be previously laminated and integrated. It is not limited to the configuration of two layers of the sheet or nonwoven fabric (1) containing a thermoplastic resin and the nonwoven fabric (2) containing heat-resistant fibers, but may include a combination of three or more layers using different types of sheets or nonwoven fabrics in each layer. When the resin component is formed of a thermoplastic resin having a softening point or a melting point not higher than the vulcanization temperature, then the sheet (film) or nonwoven fabric (1) containing the thermoplastic resin can be melted in the subsequent vulcanization and molding step to form a fiber/resin mixture layer. In particular, in a case where a fibrous resin component is used, for example, the fibrous resin component may melt to be a film during vulcanization (e.g., at a vulcanization temperature of from 150 to 200° C.), and the resultant film may cover the surface of the compressive rubber layer to lower the friction coefficient of the surface, therefore improving the effect of preventing noise generation. On the other hand, heat-resistant fibers not soften or melt during vulcanization can impart desired properties to the compressive rubber surface.

Particularly preferably in the present invention, the sheet or nonwoven fabric (1) containing a thermoplastic resin is arranged on the side of the compressive rubber layer, and the nonwoven fabric (2) containing heat-resistant fibers is arranged to be on the side of a mold (on the side of pulleys). When the sheet or nonwoven fabric (1) containing a thermoplastic resin is arranged on the side of the compressive rubber layer, then the surface of the compressive rubber layer could be surely covered with the thermoplastic resin (film) having softened or melted during vulcanization. When the nonwoven fabric (2) containing heat-resistant fibers is arranged to be on the side of a mold (on the side of pulleys), then the characteristics (e.g., water absorbability, abrasion resistance) of the heat-resistant fibers could be surely reflected on the frictional power transmission surface. In addition, such the lamination configuration can prevent many of heat-resistant fibers from being embedded in the surface vicinity of the inside of the compressive rubber layer (the vicinity of the interface to the fiber/resin mixture layer). Specifically, the resin component plays a role of a barrier that controls the penetration degree (embedded depth) the heat-resistant fibers to penetrate into the surface vicinity of the inside of the compressive rubber layer (the vicinity of the interface to the fiber/resin mixture layer).

In case where the fiber/resin mixture layer contains a surfactant, at least one selected from the sheet or nonwoven fabric (1) containing a thermoplastic resin and the nonwoven fabric (2) containing heat-resistant fibers may only contain the surfactant. Specifically, so far as the surfactant is contained in the fiber/resin mixture layer in the ratio mentioned above, the surfactant may be contained in any one or both of the two. From the viewpoint of the affinity with surfactant and the viewpoint that the surfactant could suitably bleed out to the surface of the fiber/resin mixture layer, however, it is desirable that the sheet or nonwoven fabric (1) containing a thermoplastic resin [especially the sheet or nonwoven fabric (1) containing thermoplastic resin, which arranged on the side of the compressive rubber layer] contains the surfactant.

The method of making the fiber/resin mixture layer contain a surfactant may be a method of melt-kneading a surfactant in forming (in extrusion-molding or in spinning) a sheet or nonwoven fabric, or may also be a method of making a surfactant adhered to the surface of a sheet or nonwoven fabric (especially a nonwoven fabric).

Examples of the method of making a surfactant adhered to the surface of a sheet or nonwoven fabric include a method of spraying a surfactant (or a solution or dispersion containing a surfactant), a method of coating with a surfactant (or a solution or dispersion containing a surfactant), a method of immersing a sheet or nonwoven fabric in a surfactant (or a solution or dispersion containing a surfactant). Examples of the solvent to be contained in the solution or dispersion include general-purpose solvents such as water, hydrocarbons (e.g., aromatic hydrocarbons such as toluene, xylene, etc.), ethers (e.g., linear ethers such as diethyl ether, etc.; cyclic ethers such as dioxane, tetrahydrofuran, etc.), ketones (e.g., linear ketones such as acetone, methyl ethyl ketone, etc.; cyclic ketones such as cyclohexanone, etc.), esters (e.g., acetates such as ethyl acetate), etc. These solvent may be used singly or as a mixed solvent. The concentration of the surfactant in the solution or dispersion is, for example, from 0.1 to 80% by mass, preferably from 0.3 to 50% by mass, more preferably from 0.5 to 30% by mass or so.

In addition, in the present invention, it is especially preferable that, in the winding step, a laminate prepared by previously integrating and laminating a sheet or nonwoven fabric (1) (especially a nonwoven fabric) containing a thermoplastic resin having a softening point or a melting point not higher than the vulcanization temperature and a nonwoven fabric (2) containing heat-resistant fibers is used, and the sheet or nonwoven fabric containing a thermoplastic resin is arranged on the side of the compressive rubber layer while the nonwoven fabric containing heat-resistant fibers is arranged to be on the side of a mold (on the side of pulleys). When such the laminate is used, it becomes unnecessary to separately wind the sheet or nonwoven fabric containing a thermoplastic resin and the nonwoven fabric containing heat-resistant fibers in the winding step, that is, only one winding operation is required, and therefore it is excellent in operability and the productivity, and in addition, any influence on the interface (generation of gaps, etc.) due to separate winding could be prevented. Further, probably because the uniformity in the fiber/resin mixture layer can be improved, the ability of the belt to suppress noise generation and to enhance abrasion resistance can be thereby improved.

The proportion of the sheet containing the thermoplastic resin to the nonwoven fabric containing the heat-resistant fibers can be controlled with ease by changing the thickness of at least one of the two (e.g., by increasing the winding frequency, or by combining those having a different thickness).

In the vulcanization molding step, the wound laminate sheet (shaped body) may only be pressed against a mold to vulcanize and mold at least the unvulcanized rubber sheet of the compressive rubber layer. For example, in the case of a V-ribbed belt, an inner mold with a shaped body wound therearound is concentrically placed to an outer mold having a pattern of plural ribs marked on the inner periphery thereof. In this stage, a predetermined clearance is provided between the inner periphery of the outer mold and the outer periphery of the shaped body. Subsequently, an flexible jacket is expanded toward the inner periphery (pattern of ribs) of the outer mold (e.g., by from 1 to 6% or so) to thereby press the shaped body (e.g., comprising the nonwoven fabric containing heat-resistant fibers, the sheet or nonwoven fabric containing a thermoplastic resin, the compressive rubber layer) against the ribs and vulcanize it. Finally, the inner mold is taken out of the outer mold, then the vulcanized rubber sleeve having plural ribs is demolded from the outer mold, and then the vulcanized rubber sleeve is cut with a cutter in a predetermined width in the belt length direction to complete a V-ribbed belt.

In the present invention, it is desirable that, in the vulcanization molding step, the vulcanization is performed after a pre-heated is performed at a temperature lower than the vulcanization temperature. Specifically, it is desirable that the vulcanization process after the flexible jacket has been expanded, includes a first step (for pre-heating treatment) of maintaining at a low temperature (e.g., 60 to 120° C., preferably 65 to 110° C., more preferably 70 to 100° C. or so) for a predetermined period of time (e.g., 2 to 20 minutes, preferably 3 to 15 minutes or so), and a second step of rising the temperature up to the vulcanization temperature (e.g., 150 to 200° C., preferably 160 to 180° C. or so) and keeping as such state for a predetermined period of time (e.g., 10 to 40 minutes, preferably 15 to 30 minutes). Here, a temperature range of from 60 to 120° C. is set for the low temperature, and this is for the purpose of reducing (or lowering) the flowability of the rubber composition to form the compressive rubber layer (especially the surface layer thereof) and the thermoplastic resin so that a major part of the heat-resistant fibers could be prevented from being taken in the surface vicinity of the inside of the compressive rubber layer (the vicinity of the interface to the fiber/resin mixture layer).

By arranging such two temperature steps of the first step (low temperature) and the second step (high temperature) as described above, the surfaces of the ribs can be covered with the fiber/resin mixture layer and at the same time, a part of the heat-resistant fibers can be embedded in the surface vicinity of the inside of the compressive rubber layer (the vicinity of the interface to the fiber/resin mixture layer).

The above-mentioned production method is just one example, and the present invention is not limited to this production method but may be changed and modified variously depending on the materials and the characteristics thereof. For example, the vulcanization process may only include at least the first step and the second step, and may include any other temperature step between the first step and the second step.

Except for the production method, the components and the thickness thereof may be suitably combined, and as the thermoplastic resin and the rubber composition to form the surface layer of the compressive rubber layer, a composition having a low flowability may be used.

EXAMPLES

Hereinunder the present invention is described in more detail based on Examples thereof, but the invention is not whatsoever restricted by these Examples. Measurement methods or evaluation methods for physical properties and the raw materials used in the following Examples are shown below.

[Friction Coefficient]

The friction coefficient measurement test was performed by using a tester, of which layout is illustrated in FIG. 3, arranging a drive pulley (Dr.) having a diameter of 121.6 mm, an idler pulley (IDL. 1) having a diameter of 76.2 mm, an idler pulley (IDL. 2) having a diameter of 61.0 mm, an idler pulley (IDL. 3) having a diameter of 76.2 mm, an idler pulley (IDL. 4) having a diameter of 77.0 mm, and a driven pulley (Dn.) having a diameter of 121.6 mm in this order. A V-ribbed belt was hooked on each pulley of the tester. In ordinary running (DRY), the belt was run at room temperature, at a drive pulley rotation number of 400 rpm, and at a belt winding angle around the driven pulley of 20°, while given a predetermined load (180 N/6 Rib) applied thereto. The torque of the driven pulley was increased from 0 up to at most 20 Nm, and from the torque value of the driven pulley at the time at which the belt slip velocity to the driven pulley is the highest (100% slip), the friction coefficient μ was calculated in accordance with the following equation.

$$\mu = \ln(T1/T2)/\alpha$$

Here, T1 is a tension on the tight side, T2 is a tension on the loose side, α is a belt winding angle around the driven pulley, and they can be determined according to the following equations.

$$T1 = T2 + Dn \cdot \text{torque (kgf·m)}/(121.6/2000),$$

$$T2 = 180 \text{ (N/6 Rib)},$$

$$\alpha = \pi c/9 \text{ (rad) (in the equation, rad means a radian)}.$$

The case of running under being soaked with water (WET) is the same as ordinary running except that the drive pulley rotation number is 800 rpm, the belt winding angle around the driven pulley was 45° ($\alpha = \pi/4$) and 300 ml/min of water was kept applied to the vicinity of the inlet to the driven pulley, as the layout is illustrated in FIG. 4. The friction coefficient μ was determined in the same manner as above, using the above-mentioned equation.

[Noise Generation Limit Angle]

The misalignment noise generation test (noise generation limit angle) was performed by using a tester, of which layout is illustrated in FIG. 5, arranging a drive pulley (Dr.) having a diameter of 90 mm, an idler pulley (IDL. 1) having a diameter of 70 mm, a misalignment pulley (W/P) having a diameter of 120 mm, a tension pulley (Ten.) having a diameter of 80 mm, an idler pulley (IDL. 2) having a diameter of 70 mm, and an idler pulley (IDL. 3) having a diameter of 80 mm in thin order, in which the axial distance (span length) between the idler pulley (IDL. 1) and the misalignment pulley (W/P) was set at 135 mm, and all the pulleys were adjusted to be positioned on the same plane (misalignment angle of 0°). A V-ribbed belt was hooked on each pulley of the tester. At room temperature, a tension was applied at drive pulley rotation of 1000 rpm so that the belt tension could be 300 N/6 Rib, and at around the exit of the drive pulley, 5 cc of water was periodically (at intervals of about 30 seconds) applied to the frictional power transmission surface of the V-ribbed belt, and the angle (noise generation limit angle) at which noise would occur (at around the inlet of the misalignment pulley) when the belt was run in misalignment (the misalignment pulley was displaced toward the front side of the drawing relative to each pulley) was determined. Also in ordinary running (in the same layout and under the same running condition as those for running under being wetted with water except that water was not applied), the noise generation limit angle was determined in the same manner. A larger value of noise generation limit angle means excellent noise suppression. When the noise generation limit angle was 2° or more in both running when soaked with water and ordinary running, the noise suppression was determined as good.

[Wear Rate]

The wear test was performed by using a tester, of which layout is illustrated in FIG. 6, arranging a drive pulley (Dr.) having a diameter of 120 mm, an idler pulley (IDL. 1) having a diameter of 85 mm, a driven pulley (Dn.) having a diameter of 120 mm, and a tension pulley (Ten.) having a diameter of 60 mm arranged in this order. A V-ribbed belt was hooked on each pulley of the tester. A certain load (91 kg/6 Rib) was applied under the condition that the rotation number of the drive pulley (Dr.) was 4900 rpm, the belt winding angle of the idler pulley (IDL.) and the tension pulley (Ten.) was 90° and the driven pulley load was 10.4 kW, and the belt was run for 24 hours at an ambient temperature of 120° C. The wear rate was determined by dividing the wear volume (=belt mass before running−belt mass after running) by the belt mass before running. A lower value of the wear rate means excellent abrasion resistance. When the value was 1.4% or less, the abrasion resistance was determined as good.

[Embedded Depth]

A V-ribbed belt was cut in the direction parallel to the belt width direction, and the cut surface (especially the side of rib) was observed (at 50-power magnification) with a scanning electronic microscope (manufactured by JEOL, "JSM5900LV"). The embedded depth of the heat-resistant fibers embedded in the vicinity of the interface to the fiber/resin mixture layer inside the compressive rubber layer was measured in the manner as mentioned below.

1) The side of the rib is nearly linear, and therefore, a line A is drawn along the boundary between the fiber/resin mixture layer and the surface layer of the compressive rubber layer (heat-resistant fibers-embedded layer).
2) At arbitrary 5 points of the groove side of the rib, the tip side of the rib and the area between them, a vertical line B is drawn from the boundary between the heat-resistant fibers-embedded layer and the inner layer with no embedded therein toward the line A, and the length of the vertical line B is determined.
3) The values of the length of the vertical line B at 5 points determined in 2) are averaged to be the embedded depth of the heat-resistant fibers.

[Resin Component]

The thermoplastic resin to be the resin component in the fiber/resin mixture layer to be arranged on the side of the compressive rubber layer is shown in Table 1.

Thermoplastic resin A (manufactured by Tamapoly Co., Ltd., "Multitoron") is a film of which material is polyethylene (melting point: 130° C.), and has a thickness of 0.04 mm and a weight of 38 g/m².

Thermoplastic resin B1 (manufactured by Idemitsu Unitech Co., Ltd., "Stratech") is a nonwoven fabric formed of long fibers of which material is polyethylene (melting point: 125° C.), and has a thickness of 0.20 mm and a weight (weight per area) of 30 g/m².

Thermoplastic resin B2 (manufactured by Idemitsu Unitech Co., Ltd., "Stratech") is a nonwoven fabric formed of long fibers of which material is polyethylene (melting point: 125° C.), containing 4% by mass of nonionic surfactant kneaded in the fibers, and has a thickness of 0.20 mm and a weight (weight per area) of 30 g/m².

Thermoplastic resin C (manufactured by Shinwa Corp, "spun-bond nonwoven fabric") is a nonwoven fabric formed of composite long fibers of which core material is polypropylene (melting point: 170° C.) and sheath is polyethylene (melting point: 125° C.), and has a thickness of 0.20 mm and a weight (weight per area) of 30 g/m².

TABLE 1

| Resin Component | A | B1 | B2 | C |
| --- | --- | --- | --- | --- |
| Material | PE | PE | PE | PP/PE |
| Form | film | nonwoven fabric | nonwoven fabric | nonwoven fabric |

TABLE 1-continued

| Resin Component | A | B1 | B2 | C |
|---|---|---|---|---|
| Presence or Absence of Surfactant | Absence | Absence | Presence | Absence |
| Thickness (mm) | 0.04 | 0.20 | 0.20 | 0.20 |

The nonwoven fabrics containing heat-resistant fibers, which were arranged on the side of pulleys are shown in Table 2. Nonwoven fabric E (manufactured by Unitika Ltd., "Cottoace") is a nonwoven fabric of which material is cotton, and has a thickness of 0.15 mm, a fiber length of from 5 to 50 mm and a weight (weight per area) of 30 g/m². Nonwoven fabric F (manufactured by Unitika Ltd., "Cottoace") is a nonwoven fabric of which material is cotton, and has a thickness of 0.23 mm, a fiber length of from 5 to 50 mm and a weight (weight per area) of 45 g/m². Nonwoven fabric G (manufactured by Omikenshi Co., Ltd., "Crabyon") is a nonwoven fabric of which material is rayon, and has a thickness of 0.20 mm, a fiber length of from 5 to 50 mm and a weight (weight per area) of 40 g/m². Nonwoven fabric H (manufactured by Omikenshi Co., Ltd., "Crabyon") is a nonwoven fabric of which material is rayon and polyethylene terephthalate (PET) mixed randomly (ratio by weight of rayon to PET is 70/30), and has a thickness of 0.21 mm and a weight (weight per area) of 40 g/m², in which the rayon has a fiber length of about 50 mm and PET forms long fibers. Nonwoven fabric I (manufactured by Omikenshi Co., Ltd., "Crabyon") is a nonwoven fabric of which material is rayon, PET and polyethylene (melting point: 125° C.) mixed randomly (ratio by weight of rayon/PET/polyethylene is 70/15/15), and has a thickness of 0.21 mm and a weight (weight per area) of 40 g/m², in which the rayon has a fiber length of about 50 mm and PET and polyethylene form long fibers. Nonwoven fabric J (manufactured by Idemitsu Unitech Co., Ltd., "Stramighty") is a two-layer structure of laminating a nonwoven paper of which material is pulp (thickness 0.25 mm) and a nonwoven fabric of polyethylene (melting point: 125° C., thickness 0.10 mm), and has a weight (weight per area) of 30 g/m², in which the pulp has a fiber length of from 2 to 7 mm and polyethylene forms long fibers.

TABLE 2

| | Nonwoven Fabric | | | | | |
|---|---|---|---|---|---|---|
| | E | F | G | H | I | J |
| Material | cotton | cotton | rayon | rayon/PET | rayon/PET/PE | pulp PE |
| Form | nonwoven fabric | nonwoven fabric | nonwoven fabric | nonwoven fabric | nonwoven fabric | pulp nonwoven paper PE nonwoven fabric |
| Thickness (mm) | 0.15 | 0.23 | 0.20 | 0.21 | 0.21 | pulp 0.25 PE 0.10 |
| Weight Ratio | — | — | — | 70/30 | 70/15/15 | 60/40 |
| PE Melting Point (° C.) | — | — | — | — | 125 | 125 |
| Fiber Length (mm) | 5 to 50 | 5 to 50 | 5 to 50 | rayon about 50 PET long fibers | rayon about 50 PET long fibers PE long fibers | pulp 2 to 7 PE long fibers |
| Weight (g/m²) | 30 | 45 | 40 | 40 | 40 | 30 |

TABLE 1-continued

| Resin Component | A | B1 | B2 | C |
|---|---|---|---|---|
| Melting Point (° C.) | 130 | 125 | 125 | PP 170 PE 125 |
| Weight (g/m²) | 38 | 30 | 30 | 30 |
| Type of Fibers | — | long fibers | long fibers | long fibers |

[Raw Materials of Compressive Rubber Layer, Extensible Layer, and Tension Member]

EPDM polymer: manufactured by DuPont Dow Elastomer Japan, "IP3640"

Carbon black HAF: manufactured by Tokai Carbon Co., Ltd., "Sheast 3"

Anti-aging agent: manufactured by Seiko Chemical Corporation, "Nonflex OD3"

Nylon short fibers: Nylon 66; fiber length, about 0.5 mm

Organic peroxide: manufactured by Kayaku Akzo Corporation, "Perkadox 14RP"

Tension member: Fibers produced by double-twisting 1,000-denier PET fibers in a twisting mode of 2×3 at a final twist coefficient of 3.0 and a primary twist coefficient of 3.0, and subjecting the obtained cord having a total denier of 6,000 to adhesion treatment.

Examples 1 to 9, and Comparative Examples 1 and 2

(Formation of Compressive Rubber Layer and Extensible Layer)

The rubber composition (part by mass) shown in Table 3 was kneaded with a Banbury mixer, and rolled with a calender roll to form a rubber sheet for forming a compressive rubber layer and an extensible layer, each having a thickness of 2.5 mm and 0.8 mm, respectively.

TABLE 3

| Material | Rubber for Compressive Rubber Layer | Rubber for Extensible Layer |
|---|---|---|
| EPDM Polymer | 100 | 100 |
| Zinc Oxide | 5 | 5 |
| Stearic Acid | 1 | 1 |

TABLE 3-continued

| Material | Rubber for Compressive Rubber Layer | Rubber for Extensible Layer |
|---|---|---|
| Carbon Black HAF | 80 | 80 |
| Paraffinic Oil | 15 | 15 |
| Anti-aging Agent | 2 | 2 |
| Organic Peroxide | 5 | 5 |
| Nylon Short Fibers | 0 | 15 |
| Total | 208 | 223 | the nonwoven pulp paper was arranged on the mold side (on the side of pulleys)), but the thermoplastic resin in Table 1 was not used. In Comparative Example 1, only the thermoplastic resin B1 in Table 1 was used but the nonwoven fabric in Table 2 was not used. In Comparative Example 2, only the nonwoven fabric F in Table 2 was used but the thermoplastic resin in Table 1 was not used. The belts produced here were 6-rib belts having a belt length of 1,100 mm and having a K-type rib form.

The friction coefficient and the noise generation limit angle in dry (DRY) and in wet (WET) of the obtained belt, and the wear rate thereof are shown in Table 4.

TABLE 4

| | | Example | | | | | | | | | Comparative Example | |
|---|---|---|---|---|---|---|---|---|---|---|---|---|
| | | 1 | 2 | 3 | 4 | 5 | 6 | 7 | 8 | 9 | 1 | 2 |
| Resin Component | | A | B1 | A | C | B1 | B1 | B1 | J | B2 | B1 | — |
| Heat-Resistant Fibers-Containing Nonwoven Fabric | | E | E | F | F | G | H | I | | E | — | F |
| Ratio by Weight (resin component/nonwoven fabric) | | 56/44 | 50/50 | 46/54 | 40/60 | 43/57 | 43/57 | 50/50 | 60/40 | 50/50 | 100/0 | 0/100 |
| Friction Coefficient | DRY | 1.20 | 1.25 | 1.30 | 1.20 | 1.20 | 1.30 | 1.20 | 1.20 | 1.20 | 1.00 | 1.80 |
| | WET | 0.70 | 0.75 | 0.80 | 0.60 | 0.60 | 0.60 | 0.75 | 0.80 | 0.80 | 0.35 | 1.00 |
| Noise Generation Limit Angle (°) | DRY | ribs misaligned | ribs misaligned | ribs misaligned | ribs misaligned | ribs misaligned | ribs misaligned | ribs misaligned | ribs misaligned | ribs misaligned | ribs misaligned | 2.5 |
| | WET | 2.4 | 3.0 | 2.8 | 2.8 | 2.7 | 2.5 | ribs misaligned | ribs misaligned | ribs misaligned | 1.9 | 1.5 |
| Wear Rate (%) | | 1.1 | 1.3 | 1.3 | 1.1 | 1.3 | 0.9 | 1.2 | 1.0 | 1.1 | 1.5 | 1.7 |
| Embedded Depth (μm) | | 40 | 35 | 50 | 40 | 30 | 35 | 25 | 20 | 20 | — | 60 |

(Production of Belt)

The unvulcanized sheet for extensible layer was wound around an inner mold equipped with a flexible jacket around the outer periphery thereof, then a tension member was helically spun thereover (at a pitch of 1.15 mm, and under a tension of 5 kgf), and further the unvulcanized sheet for compressive rubber layer and a sheet for fiber/resin mixture layer were sequentially wound therearound to produce a laminate sheet (shaped body). The laminate sheet (shaped body) was vulcanized by pressing the laminate sheet (shaped body) against the mold with the expansion pressure of the flexible jacket kept at 1.0 MPa, then keeping it as such at a temperature of 80° C. for a time of 10 minutes (first step), and thereafter heating it up to a temperature of 170° C. and keeping it at the temperature for 20 minutes (second step). After the vulcanization, this was cooled to around room temperature, and the outer mold was taken out of the inner mold, and thereafter the vulcanized belt sleeve was demolded from the outer mold.

As the sheet for fiber/resin mixture layer, the resin component in Table 1 and the nonwoven fabric containing heat-resistant fibers in Table 2 were combined to prepare 11 types of belts as shown in Table 4. In Examples 1 to 7 and 9, the resin component in Table 1 was arranged on the side of the compressive rubber layer, and the nonwoven fabric in Table 2 was arranged thereon (on the mold side (on the side of pulleys)). In Example 8, a layer of a polyethylene nonwoven fabric was arranged on the side of the compressive rubber layer as the nonwoven fabric J in Table 2 (and As obvious from the results in Table 4, the friction coefficient in dry in Examples 1 to 9 was higher than that in Comparative Example 1. This is considered because the surfaces of the ribs in Comparative Example 1 were coated with a layer of a single resin having a low friction coefficient, but in Examples 1 to 9, the surfaces were coated with a fiber/resin mixture layer containing a resin having a low friction coefficient and fibers having a higher friction coefficient than that in a mixed state. In Comparative Example 2, a thermoplastic resin was not used and therefore a major part of the fibers constituting the nonwoven fabric would have been taken in the inside of the compressive rubber layer and, as a result, the rubber composition having a high friction coefficient much occupied the frictional power transmission surface to give the highest friction coefficient. From these, it is understood that the resin component arranged on the side of the compressive rubber layer could prevent penetration to a certain level or more of the nonwoven fabric (heat-resistant fibers) arranged on the side of pulleys into the inside of the compressive rubber layer (Comparative Example 2 was compared with Examples 3 and 4, all using the same nonwoven fabric F).

The friction coefficient when soaked with water in Examples 1 to 9 was higher than that in Comparative Example 1. This is because cellulosic fibers having a high water absorption (heat-resistant fibers) were used as the material of the nonwoven fabric to prevent formation of a water film between the frictional power transmission surface and pulleys. The V-ribbed belt in Comparative Example 2 had the highest friction coefficient owing to the high friction coefficient in dry and the water-absorbing effect of the cellulosic fibers locally exposed out of the frictional power transmission surface.

In Examples 1 to 9 and Comparative Example 1, the noise generation limit angle in dry was high as 2° or more, and there occurred no noise generation until occurrence of misalignment of ribs (the misalignment angle was within a range of from 3.5 to 4°). Also in Comparative Example 2, the noise generation limit angle was not less than 2° and it is not problematic in point of noise suppression, however, as compared with that of the others, the noise generation limit angle was low and therefore it was poor in point of noise suppression.

The noise suppression when soaked with water is discussed. In Examples 1 to 9, the noise generation limit angle was 2° or more and it is found that they are excellent in noise suppression. In Comparative Example 1, the friction coefficient when soaked with water was the lowest and slips readily occurred on pulleys, and accordingly the sound generation limit angle was 1.9° and was lower than that in Examples. In Comparative Example 2, the change (difference) in the friction coefficient between in dry and in wet was the largest, and therefore the noise generation limit angle was 1.5°, that is, it was the worst in point of noise suppression.

The wear rate in Examples 1 to 9 was lower than that in Comparative Examples 1 and 2, and it is found that they are excellent in abrasion resistance. In Comparative Example 1, the surfaces of the ribs were covered with a layer of a thermoplastic resin alone not reinforced by a nonwoven fabric (heat-resistant fibers), and therefore the wear rate was high. In Comparative Example 2, the friction coefficient was high as compared with that in the others, and rubbing against pulleys (frictional force) strongly affected, and therefore, the abrasion resistance was the lowest.

In Example 8, a side surface of ribs (frictional power transmission surface) was observed with a microscope, and a cross section of ribs was observed with a scanning electronic microscope. The results are shown in FIGS. 7 and 8. In the side surface of ribs in FIG. 7, the lower side of the photographic picture is the side of the rib tip, and the upper side thereof is the side of the rib groove (the belt backside). The depth (embedded depth) of the heat-resistant fibers embedded in the surface vicinity of the inside of the compressive rubber layer (the vicinity of the interface to the fiber/resin mixture layer) was shown in Table 4.

As obvious from FIG. 7, in the belt of Example 8, the entire area of the side surface of ribs was covered with the fiber/resin mixture layer and the fibers were exposed out of the surface thereof. Also as obvious from FIG. 8, it is found that, in the cross section of ribs, a fiber/resin mixture layer having a thin thickness exists on the outer side (on the side of pulleys) and in the inside thereof, heat-resistant fibers are embedded in the surface vicinity of the inside of the compressive rubber layer (the vicinity of the interface to the fiber/resin mixture layer) (the embedded depth is 20 μm).

In Example 9, the friction coefficient in DRY lowered as compared with that in Example 2, and the friction coefficient in WET increased, and accordingly, the difference in the friction coefficient between DRY/WET reduced. The noise generation limit angle in WET was changed from 3.0° to no noise generation at misalignment of ribs, that is, the noise suppression when soaked with water was improved. This phenomenon is considered because the surfactant contained in the resin component (polyethylene layer) on the side of the compressive rubber layer bled out on the surface of the nonwoven fabric layer containing heat-resistant fibers on the side of pulleys, and therefore a surfactant film would be formed on the frictional power transmission surface.

While the present invention has been described in detail and with reference to specific embodiments thereof, it will be apparent to one skilled in the art that various changes and modifications can be made therein without departing from the spirit and scope thereof.

The present application is based on a Japanese patent application 2012-240787 filed on Oct. 31, 2012 and a Japanese patent application 2013-171044 filed on Aug. 21, 2013, the contents of which are incorporated herein by reference.

INDUSTRIAL APPLICABILITY

The frictional power transmission belt of the present invention can be utilized for various types of frictional power transmission belts, for example, V-ribbed belts, raw-edge V-belts, flat belts, etc., and is especially useful for V-ribbed belts, V-belts and others for which the production process by grinding is complicated.

DESCRIPTION OF REFERENCE NUMERALS AND SIGNS

1 Tension Member
2 Compressive Rubber Layer
3 Ribs
4 Short Fibers
5 Extensible Layer
6 Adhesive Layer
11, 12, 13, 14, 15, 16 Heat-Resistant Fibers

The invention claimed is:

1. A method for producing a frictional power transmission belt, the method comprising:
   winding a first unvulcanized sheet around an inner mold, the inner mold having a flexible jacket provided around an outer periphery thereof, the first unvulcanized sheet having a rubber composition and corresponding to an extensible layer of the frictional power transmission belt;
   helically winding a tension member on the first unvulcanized sheet;
   winding a second unvulcanized sheet around the first unvulcanized sheet having the tension member wound thereon, the second unvulcanized sheet corresponding to a compressive rubber layer of the frictional power transmission belt;
   forming a fiber/resin mixture layer comprising a resin component and heat-resistant fibers, the heat-resistant fibers having a softening point or a melting point higher than a vulcanization temperature for vulcanizing the first and second unvulcanized sheets;
   winding the fiber/resin mixture layer around the second unvulcanized sheet to create a wound laminate sheet, wherein some of the heat-resistant fibers are embedded in the fiber/resin mixture layer so as to extend out from the fiber/resin mixture layer to make contact with the compressive rubber layer; and
   vulcanizing the first and second unvulcanized sheets to respectively create first and second vulcanized sheets by pressing the wound laminate sheet against an outer mold at the vulcanization temperature,
   wherein the fiber/resin mixture layer has a first surface in contact with the second unvulcanized sheet, and a second surface opposite the first surface, wherein a portion of one or more of the heat-resistant fibers of the fiber/resin mixture layer extend out from the second surface of the fiber/resin mixture layer.

2. The method according to claim 1, wherein the second unvulcanized sheet comprises a rubber component and a vulcanizing agent or a crosslinking agent.

3. The method according to claim 1, wherein the second unvulcanized sheet comprises a polyurethane composition.

4. The method according to claim 1, wherein an outer surface of the first vulcanized sheet has a concavo-convex shape.

5. The method according to claim 1, wherein the tension member comprises one or more of polyester fibers, aramid fibers, and inorganic fibers.

6. The method according to claim 1, further comprising:
forming an adhesive layer between the tension member and the first vulcanized sheet.

7. The method according to claim 1, wherein the vulcanization temperature used for vulcanizing the first and second unvulcanized sheets is between 150 degrees C. to 200 degrees C.

8. The method according to claim 7, wherein the heat-resistant fibers have a softening point or a melting point higher than the vulcanization temperature such that, after the first and second unvulcanized sheets are vulcanized to create the first and second vulcanized sheets, the heat-resistant fibers contained within the fiber/resin mixture layer maintain their fibrous form.

9. The method according to claim 1, wherein the softening point or the melting point of the heat-resistant fibers is between 10 to 20 degrees C. higher than the vulcanization temperature.

10. The method according to claim 1, wherein at least one of the heat-resistant fibers embedded in the fiber/resin mixture layer extends out from a lower surface of the fiber/resin mixture layer into the compressive rubber layer, and wherein the at least one of the heat-resistant fibers embedded in the fiber/resin mixture layer extends out from an upper surface of the fiber/resin mixture layer to make direct contact with a pulley when the frictional power transmission belt is coupled to a power transmission of a vehicle.

11. A method for producing a frictional power transmission belt, the method comprising:
winding a first unvulcanized sheet around an inner mold, the inner mold having a flexible jacket provided around an outer periphery thereof, the first unvulcanized sheet having a rubber composition and corresponding to an extensible layer of the frictional power transmission belt;
helically winding a tension member on the first unvulcanized sheet;
winding a second unvulcanized sheet around the first unvulcanized sheet having the tension member wound thereon, the second unvulcanized sheet corresponding to a compressive rubber layer of the frictional power transmission belt;
forming a fiber/resin mixture layer comprising a resin component and heat-resistant fibers, the heat-resistant fibers having a softening point or a melting point higher than a vulcanization temperature for vulcanizing the first and second unvulcanized sheets;
winding the fiber/resin mixture layer around the second unvulcanized sheet to create a wound laminate sheet, wherein some of the heat-resistant fibers are embedded in the fiber/resin mixture layer so as to extend out from the fiber/resin mixture layer to make contact with the compressive rubber layer; and
vulcanizing the first and second unvulcanized sheets to respectively create first and second vulcanized sheets by pressing the wound laminate sheet against an outer mold at the vulcanization temperature,
wherein the fiber/resin mixture layer has a thickness of between 5 to 150 μm.

12. A method for producing a frictional power transmission belt, the method comprising:
winding a first unvulcanized sheet around an inner mold, the inner mold having a flexible jacket provided around an outer periphery thereof, the first unvulcanized sheet having a rubber composition and corresponding to an extensible layer of the frictional power transmission belt;
helically winding a tension member on the first unvulcanized sheet;
winding a second unvulcanized sheet around the first unvulcanized sheet having the tension member wound thereon, the second unvulcanized sheet corresponding to a compressive rubber layer of the frictional power transmission belt;
forming a fiber/resin mixture layer comprising a resin component and heat-resistant fibers, the heat-resistant fibers having a softening point or a melting point higher than a vulcanization temperature for vulcanizing the first and second unvulcanized sheets;
winding the fiber/resin mixture layer around the second unvulcanized sheet to create a wound laminate sheet, wherein some of the heat-resistant fibers are embedded in the fiber/resin mixture layer so as to extend out from the fiber/resin mixture layer to make contact with the compressive rubber layer;
heating the first and second unvulcanized sheets during a first time period at a heating temperature less than the vulcanization temperature; and
vulcanizing the first and second unvulcanized sheets to respectively create first and second vulcanized sheets by pressing the wound laminate sheet against an outer mold at the vulcanization temperature, wherein the vulcanizing comprises heating the first and second unvulcanized sheets during a second time period at the vulcanization temperature.

13. The method according to claim 12, wherein the vulcanization temperature is 170 degrees C., and wherein the heating temperature is 80 degrees C.

14. The method according to claim 12, wherein the first time period is 10 minutes, and wherein the second time period is 20 minutes.

* * * * *